(12) United States Patent
Iwadare et al.

(10) Patent No.: US 7,145,665 B2
(45) Date of Patent: Dec. 5, 2006

(54) LIGHT SOURCE APPARATUS, ITS MANUFACTURING METHOD AND APPARATUS, REFLECTOR FOCAL POSITION-LOCATING METHOD AND APPARATUS, FOCAL POSITION-LOCATING LIGHT SOURCE, DISCHARGE LAMP EMISSION POSITION-LOCATING METHOD AND APPARATUS, AND DISCHARGE LAMP-REFLECTOR POSITIONING METHOD AND APPARATUS

(75) Inventors: Yoshiji Iwadare, Matsumoto (JP); Kazuto Shinohara, Suwa (JP); Shohei Fujisawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 518 days.

(21) Appl. No.: 10/250,905

(22) PCT Filed: Jan. 10, 2002

(86) PCT No.: PCT/JP02/00072

§ 371 (c)(1),
(2), (4) Date: Jul. 24, 2003

(87) PCT Pub. No.: WO02/055925

PCT Pub. Date: Jul. 18, 2002

(65) Prior Publication Data
US 2004/0063376 A1 Apr. 1, 2004

(30) Foreign Application Priority Data
Jan. 11, 2001 (JP) ............................ 2001-003677
Feb. 26, 2001 (JP) ............................ 2001-050316

(51) Int. Cl.
*G01B 11/14* (2006.01)

(52) U.S. Cl. ..................... 356/614; 356/622; 445/4; 445/64

(58) Field of Classification Search ........ 356/121–123, 356/614–623; 362/268, 294, 311, 310, 345, 362/373; 369/868; 313/113; 445/4, 64
See application file for complete search history.

(56) References Cited

U.S. PATENT DOCUMENTS

| 5,193,124 | A | * | 3/1993 | Subbarao | .................... 382/255 |
| 6,123,429 | A | * | 9/2000 | Osawa | ...................... 359/868 |
| 6,280,059 | B1 | * | 8/2001 | Ito et al. | ..................... 362/269 |
| 6,695,461 | B1 | * | 2/2004 | Ozawa et al. | ............... 362/268 |
| 6,860,776 | B1 | * | 3/2005 | Kai et al. | ..................... 445/4 |

(Continued)

FOREIGN PATENT DOCUMENTS

JP A 56-48608 5/1981

(Continued)

*Primary Examiner*—Hoa Q. Pham
(74) *Attorney, Agent, or Firm*—Oliff & Berridge, PLC

(57) ABSTRACT

The light emitted from a focal position-detecting light source 38 and reflected from a reflector 12 is projected onto a screen 341, and a projected image on the screen 341 is detected by a focal position-detecting camera 35. Based on this projected image, the focal position-detecting light source 38 is moved by a position adjusting system 37 so as to place the focal position-detecting light source 38 at a focal position of the reflector 12, and the position of the focal position-detecting light source 38 at this time is detected as the focal position of the reflector 12. When the focal position of the reflector 12 is detected, the projected image on the screen 341 detected by the focal position-detecting camera 35 is used, and, therefore, the conventional measurement by a three dimensional measuring instrument is made unnecessary, thereby improving the working efficiency.

9 Claims, 23 Drawing Sheets

U.S. PATENT DOCUMENTS 6,903,827 B1 * 6/2005 Kitabayashi et al. ........ 356/614
2002/0080612 A1 * 6/2002 Ozawa et al. ............... 362/268

FOREIGN PATENT DOCUMENTS

| | | | |
|---|---|---|---|
| JP | A 3-115827 | 5/1991 |
| JP | A 5-87630 | 4/1993 |
| JP | A 2000-299270 | 10/2000 |
| JP | A 2000-323287 | 11/2000 |
| JP | A 2000-349003 | 12/2000 |
| JP | A 2000-357405 | 12/2000 |

* cited by examiner

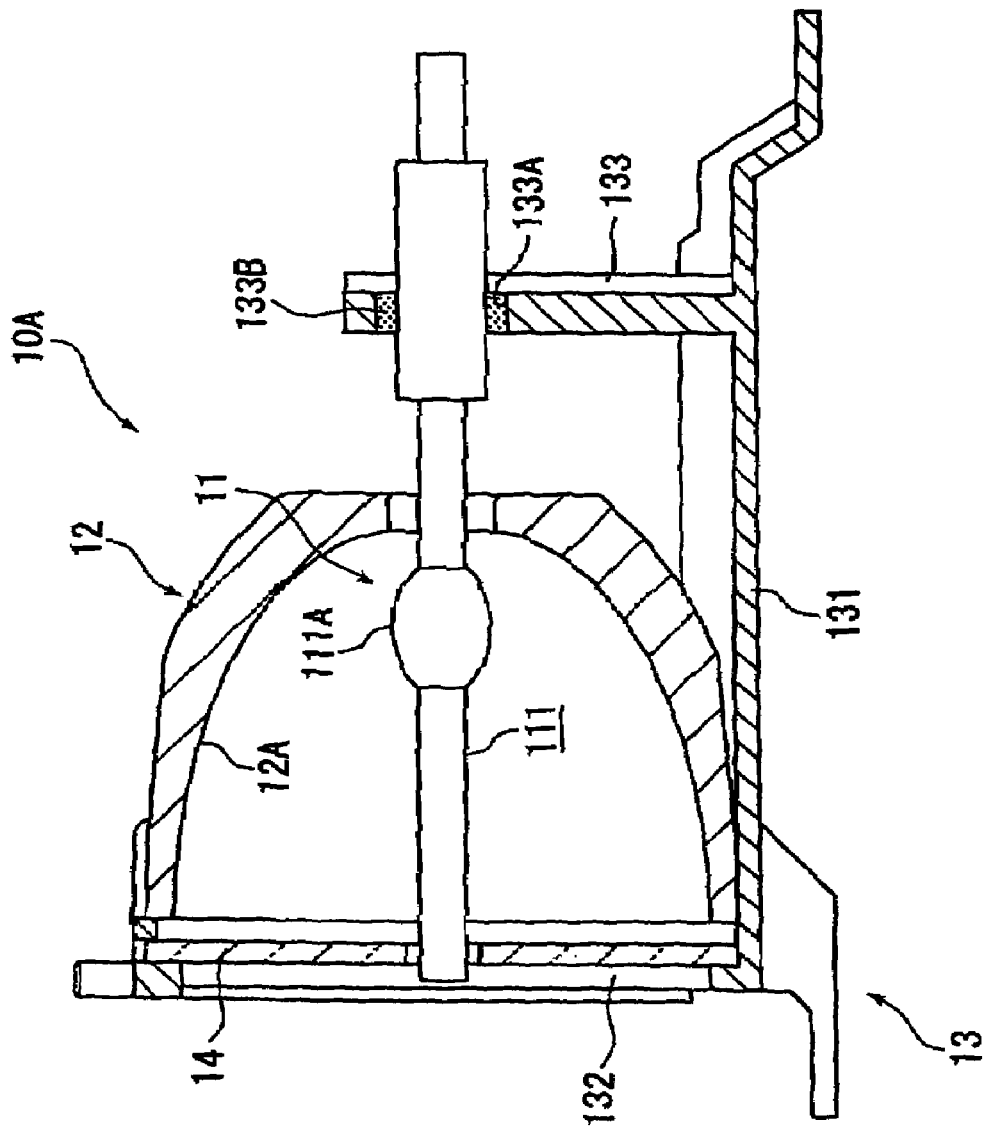

LIGHT SOURCE APPARATUS, ITS MANUFACTURING METHOD AND APPARATUS, REFLECTOR FOCAL POSITION-LOCATING METHOD AND APPARATUS, FOCAL POSITION-LOCATING LIGHT SOURCE, DISCHARGE LAMP EMISSION POSITION-LOCATING METHOD AND APPARATUS, AND DISCHARGE LAMP-REFLECTOR POSITIONING METHOD AND APPARATUS

TECHNICAL FIELD

The present invention relates to a light source apparatus, its manufacturing method and apparatus, a reflector focal position-detecting method and apparatus, a focal position-detecting light source, a discharge lamp emission position-detecting method and apparatus, and a discharge lamp-reflector positioning method and apparatus.

BACKGROUND ART

Conventionally, it is known that projectors have been used for presentations such as conferences, academic conferences, exhibitions and the like. In such projectors, the light flux emitted from a light source apparatus is modulated according to image information to form an optical image, and this optical image is magnified and projected Here, as the light source apparatus, there is available an apparatus constituted by containing a light source lamp such as a discharge lamp and the like and a reflector which reflects the light ray from this light source lamp. In the manufacturing step of such a light source apparatus, a mutual position adjustment (alignment adjustment) is required so that the physical relationship between the reflector and the light source lamp becomes best adequate, that is, a focal position of the reflector and an emission position of the light source lamp are approximately matched.

However, since the reflector has a broad range of shapes and variations, the focal position of the reflector is also different for every reflector. Accordingly, when the focal position of the reflector is obtained, the shape of each reflector is measured by a three-dimensional measuring instrument and, based on this measurement result, the focal position is calculated for every reflector.

However, since the measurement by the above-described three-dimensional measuring instrument takes the time and labor, there arises a problem in that the working efficiency is not efficient For this reason, the following method of a position alignment with the light source lamp and the reflector has been adopted so far, in which the measurement by the three-dimensional measuring instrument is made unnecessary.

First, the light source lamp is temporarily placed inside the reflector and, after being held in such a state and set on an adjustment jig having an optical unit of the same constitution as that of an actual projector, a discharge is generated between a pair of electrodes to lighten the light source lamp. After the light source lamp is warmed up enough to stabilize its luminance, the luminance measurement of a projected light projected through the optical unit is performed.

After the mutual positions of the light source lamp and the reflector are adjusted so that the luminance of the projected light measured in this way becomes the maximum, the light source lamp and the reflector are fixed by cement and the like.

However, in the above-described method of the position adjustment between the light source lamp and the reflector, since the position adjustment between the light source lamp and the reflector is performed while an luminance condition of the light actually projected onto a screen is verified, the light source lamp is definitely required to be lightened (lightening in a state of the luminance being stabilized).

For this reason, time is required from when the light source lamp is lightened till when its luminance is stabilized. In addition, after the position adjustment is performed, there arises a problem in that it is not possible to perform the subsequent fixing work and the like until the light source lamp cools down, which has reached high temperatures.

The object of the present invention is to provide a light source apparatus capable of improving an working efficiency in the manufacturing step of the light source apparatus, its manufacturing method and apparatus, a reflector focal position-detecting method and apparatus, a focal position-detecting light source, a discharge lamp emission detecting method and apparatus, and a discharge lamp-reflector positioning method and apparatus.

DISCLOSURE OF THE INVENTION

In order to achieve the above-described object, the reflector focal position-detecting apparatus of the present invention comprises the following constitution.

The reflector focal position-detecting apparatus of the present invention is characterized by comprising: reflector holding means for holding a reflector; a detecting light source to lighten in the vicinity of a focal position of the reflector held by this reflector holding means; a screen in which a reflected light emitted from this detecting light source and reflected from the reflector is projected; reflected light information detecting means for detecting information on the reflected light reflected on this screen; and a first relative displacement means for relatively displacing the detecting light source with respect to the reflector held by the reflector holding means.

According to this invention, first, the light emitted from the detecting light source and reflected from the reflector is projected to the screen, so that the information on the reflected light projected onto the screen is detected by the reflected light information detecting means. Subsequently, based on the reflected light information detected by the reflected light information detecting means, the detecting light source can be placed at the reflector focal position by relatively displacing the detecting light source with respect to the reflector by the first relative displacement means. If a coordinate value of the detecting light source placed in this way is detected, then the focal position of the reflector can be detected.

Further, when the focal position of the reflector is detected, since a planar (two-dimensional) reflected light information on the screen detected by the reflected light information detecting means is used, the measurement by the three-dimensional measuring instrument is made unnecessary, and unlike before it is possible to save the time and labor, thereby improving the working efficiency.

In the focal position-detecting apparatus of the reflector of the present invention, it is desirable that the screen is formed of a transmissive member.

According to such a constitution, since the screen is formed of the transmissive member, the information on the reflected light, which transmits the screen, can be obtained from the surface of an opposite side of the reflected light projection source of the screen. In this way, the reflected light information detecting means can be placed at the opposite side of the reflected light projection surface side of the screen, and the reflected light information detecting means cam be placed without caring about the physical relationship with the reflector and the like placed at the reflected light projection surface side of the screen so that the degree of freedom for designing can be improved.

In order to achieve the above-described object, the focal position-detecting method of the reflector of the present invention comprises the following steps.

The focal position-detecting method of the reflector of the present invention is characterized by comprising: a light source-lightening step of lightening a detecting light source in the vicinity of the focal position of the reflector; a reflected light information detecting step of detecting the information on the reflected light which is emitted from the detecting light source, reflected from the reflector and projected onto the screen after the detecting light source is lightened in this light source lightening step; and a first position adjusting step of relatively displacing the detecting light source with respect to the reflector based on the information on the reflected light obtained in this reflected light information detecting step.

According to this invention, first, the light emitted from the detecting light source and reflected from the reflector is projected onto the screen, and the information on the reflected light projected onto the screen is detected. Subsequently, based on this reflected light information, the detecting light source is relatively displaced with respect to the reflector so that the detecting light source is placed at the focal position of the reflector. If a coordinate value of the detecting light source placed in this way is detected, then the focal position of the reflector can be detected.

When the focal position of the reflector is detected, since the planar reflected light information projected onto the screen is used, the measurement by the three dimensional measuring instrument is made unnecessary, and unlike before it is possible to save the time and labor, thereby improving the working efficiency.

In order to achieve the above-described object, the manufacturing method of the light source apparatus of the present invention comprises the following steps.

The manufacturing method of the light source apparatus of the preset invention is a manufacturing method of a light source apparatus comprising the light source lamp and the reflector reflecting the light ray emitted from this light source lamp, and is characterized by comprising: a focal position-detecting step of detecting the focal position of the reflector by using the above-described focal position-detecting method of the reflector; and a second position adjusting step of approximately matching the focal position of the reflector detected by the focal position-detecting step with the emission position of the light source lamp by moving the reflector and/or the light source lamp.

According to this invention, after having detected the focal position of the reflector by using the above-described focal position-detecting method of the reflector, the alignment adjustment between the reflector and the light source lamp is performed so that the emission position of the light source lamp comes to this focal position of the reflector.

In so doing, when the alignment adjustment of the reflector and the light source lamp is performed, the focal position-detecting work of the reflector by the three-dimensional measuring instrument is made unnecessary, and unlike before it is possible to save the time and labor, thereby improving the working efficiency.

Further, since a separate detecting light source other than the light source is used for the focal position-detecting of the reflector, the lightening of the light source lamp is dispensed with, and the time required from when the light source lamp is lightened till when its luminance is stabilized is made unnecessary, and at the same time it is no longer necessary to wait until the light source lamp cools down after the alignment adjustment is performed, thereby improving the working efficiency.

In order to achieve the above-described object, the light source apparatus of the present invention comprises the following constitution.

The light source apparatus of the present invention is characterized by being manufactured by the above-described manufacturing method of the light source apparatus.

According to this invention, it is possible to obtain the light source apparatus, in which approximately the same work versus advantages as the work versus advantages in the above-described manufacturing method of the light source apparatus is achieved.

In order to achieve the above-mentioned object, the manufacturing apparatus of the light source apparatus of the present invention comprises the following constitution.

The manufacturing apparatus of the light source apparatus of the present invention is a manufacturing apparatus of the light source apparatus comprising the light source lamp and the reflector reflecting the light ray emitted from this light source lamp, and is characterized by comprising: the focal position-detecting apparatus of any one of the above-described reflectors; light source holding means for holding the light source lamp; and a second relative displacement means for relatively displacing the light source lamp with respect to the reflector held by the reflector holding means.

According to this invention, first, the focal position of the reflector is detected by the focal position-detecting apparatus of any one of the above-described reflectors. Subsequently, based on the focal position thus detected, the light source lamp is relatively displaced with respect to the reflector by the second relative displacement means so as to perform the alignment adjustment between the reflector and the light source.

By so doing, when the alignment adjustment between the reflector and the light source lamp is performed, the focal position-detecting of the reflector by the three-dimensional measuring instrument is made unnecessary, and unlike before it is possible to save the time and labor, thereby improving the working efficiency.

Further, since a separate detecting light source other than the light source lamp is used for the focal position-detecting of the reflector, the lightening of the light source lamp is dispensed with, and the time required from when the light source lamp is lightened till when its luminance is stabilized is made unnecessary, and at the same time it is no longer necessary to wait until the light source lamp cools down after the alignment adjustment is performed, thereby improving the working efficiency.

In the manufacturing apparatus of the light source apparatus of the present invention, the light source lamp is a discharge lamp lightened by a discharge generated between a pair of opposing electrodes, and at the same time comprises an emission position-detecting apparatus, which detects the emission position of the light source lamp. It is desirable that this emission position-detecting apparatus comprises: imaging means for obtaining imaging information on the pair of electrodes of the light source lamp held by the light source holding means; estimated discharge path detecting means for detecting the shortest path which couples between the pair of electrodes based on the imaging information; and emission position calculating means for finding a coordinate value of the center point of the shortest path detected by the estimated discharge path detecting means as the coordinate value of the emission position of the light source lamp.

According to this invention, in the emission position-detecting apparatus, first, in a state of the light source lamp being held by the light source holding means, the imaging information on the pair of electrodes is obtained by the imaging means. Subsequently, the shortest path coupling between the pair of electrodes is detected from this imaging information by the estimated discharge path detecting means, and a coordinate value of the center point of the shortest path, that is, the coordinate value of the emission position of the light source lamp is found by the emission position calculating means.

Since the discharge path generated between the pair of electrodes of the light source lamp usually approximately matches the shortest path coupling between the pair of electrodes, if the position of the center point of the shortest such path is found, then the emission position of the light source lamp can be found. Since the shortest path coupling between the pair of electrodes and the emission position of the light source lamp are found from the imaging information, the emission position of the light source lamp can be found without lightening the light source lamp.

When the light source lamp is placed for the reflector, the focal position of the reflector is found by the focal position-detecting apparatus. On the other hand, after obtaining the emission position of the light source lamp by the emission position-detecting apparatus, if the positioning of the light source lamp and the reflector is performed so that the emission position of the light source lamp comes to the focal position of the reflector, then the alignment adjustment of the light source apparatus can be performed without lightening the light source lamp and yet with a high degree of accuracy.

Accordingly, when the positioning of the light source lamp and the reflector is performed, it is not necessary to lighten the source lamp and, therefore, the time required from when the light source lamp is lightened till when its luminance is stabilized is dispensed with, and at the same time it is no longer necessary to wait until the light source lamp cools down after the position adjustment is performed, thereby improving the working efficiency.

In order to achieve the above-described object, the focal position-detecting light source of the reflector of the present invention comprises the following constitution.

The focal position-detecting light source of the reflector of the present invention is characterized by comprising: a light-emitting element for emitting the light; a reflecting member which is formed in a cone shape having an apex and a conical surface and reflects the light emitted from the light-emitting element in the vicinity portion of the apex of the cone surface; and a housing in which these light-emitting elements and the reflecting member are housed; wherein a hole portion for allowing the reflected light from the reflecting member to emit to the outside is formed in the housing.

According to this invention, the light from the light-emitting element is reflected on the conical surface of the reflecting member, and is emitted to the outside by passing through the hole portion of the housing. Since the reflecting member reflects the light from the light-emitting element in the vicinity portion of the apex and is emitted to the outside of the housing, the apex of the reflecting member can be regarded as a position of a point light source. Accordingly, if such a focal position-detecting light source is used, then the point light source can be easily and simply constituted.

In the focal position-detecting light source of the present invention, it is desirable that the reflecting member is formed of a reflecting prism.

According to this invention, since the reflecting member is formed of the reflecting prism, the conical surface which reflects the light can be easily and smoothly formed, thereby improving an accuracy of the reflecting surface.

In the focal position-detecting light source of the reflector of the present invention, it is desirable that the conical surface of the reflecting member is provided so as to be able to adjust its angle to the direction of the light ray emitted from the light emitting element.

According to this invention, since the conical surface of the reflecting member is provided so as to be able to adjust its angle to the direction of the light ray emitted from the light-emitting element, the emitting direction of the light which is reflected by the reflecting member can be randomly adjusted, and, for example, the light can be reflected on a random portion of the reflecting sure of the reflector.

Accordingly, in the case where such a focal position-detecting light source of the reflector is used for detecting of the focal position of the reflector, the angle of the conical surface of the reflecting member is changed plural times and, every time the angle is changed, the reflected light information projected onto the screen is detected, so that the information on the reflected light of the reflector can be obtained in a wide range, and if the focal position of the reflector is detected based on such a wide range of the information, then the detecting accuracy of the focal position can be improved.

Incidentally, in one reflector member, its angle of the conical surface may be made adjustable. Further, a plurality of reflecting members with different angles of the conical surface are prepared in advance, and the angle of the reflecting member may be made adjustable by replacing the reflecting member.

In the focal position-detecting light source of the reflector of the present invention, it is desirable that the focal position-detecting light source is constituted such that an optical fiber cable is placed between the light-emitting element and the reflecting member, and the light emitted from the light-emitting element is incident on the optical fiber cable, and the light emitted from the optical fiber cable is reflected from the reflecting member.

According to this invention, since the light emitted from the light-emitting element is incident on the reflecting member through the optical fiber cable, a diffuse light emitted from the light-emitting element can be prevented from directly leaking from a hole portion of the housing to the outside, and the reflected light only of the reflecting member is allowed to be emitted from the hole portion to the outside.

In the focal position-detecting light source of the reflector of the present invention, it is desirable that the light-emitting element is a light emitting diode.

According to the present invention, since the light emitting element is formed of the light emitting diode, the time required from when the light-emitting element is lightened till when its luminance stabilized is shortened, and at the same time the heat generation due to the lightening of the light emitting diode can be eliminated so that the cooling time after the light-out is made unnecessary.

In order to achieve the above-described object, the light source position-detecting method of the discharge lamp of the present invention adopts the following method.

The emission position-detecting method of the discharge lamp of the present invention is an emission position-detecting method of the discharge lamp lightened by the discharge generated between a pair of opposing electrodes, and is characterized in that the imaging information on the pair of electrodes is obtained and, based on this imaging information, the shortest path coupling between the pair of electrodes is detected, and the center point of this shortest path is detected as the emission position of the discharge lamp.

According to this invention, first, the image information on the pair of electrodes is obtained and, based on this imaging information, the shortest path coupling between the pair of electrodes is found. Subsequently, the center point position of this shortest path is found as the emission position of the discharge lamp.

Since the discharge path generated been the pair of electrodes of the light source lamp usually approximately matches the shortest path coupling between the pair of electrodes, if the position of the center point of the shortest such path is found, then the emission position (the position of the center point of the emission) of the discharge lamp can be found. Since the shortest such path coupling between the pair of electrodes and the emission position of the light source lamp are found from the imaging information, the lightening of the discharge lamp is made unnecessary.

When the discharge lamp is mounted to the reflector consuming, for example, a lamp unit as described above, fist, the emission position of the discharge lamp is found by the method of the present invention, and if the positioning of the discharge lamp and the reflector is performed so that the emission position found in this way comes to the focal position of the reflector, that is, the luminance of the emission light of the reflector becomes approximately the maximum, then the alignment adjustment of the lamp unit can be performed without lightening the discharge lamp.

Accordingly, when the positioning work of the discharge lamp and the reflector is performed, since the lightening of the discharge lamp is made unnecessary, the time required from when the discharge lamp is lightened till when its luminance is stabilized is dispensed with, and at the same time it is no longer necessary to wail until the discharge lamp cools down after the position adjustment is performed, thereby improving the working efficiency.

In the emission position-detecting method of the discharge lamp of the present invention, it is desirable that the standard imaging information on the standard electrodes used for the discharge lamp is obtained in advance, and by comparing the above-described image information to the standard imaging information, the shape of the pair of electrodes is determined.

According to this invention, since the standard imaging information on the standard electrodes used for the discharge lamp is obtained in advance and the shape of the pair of electrodes is determined by comparing the imaging information obtained later to the standard imaging information, in the case of the discharge lamp sealed inside with liquid such as mercury and the like similarly as, for example, high-pressure mercury lamp and the like, even if the liquid adheres on the electrodes, the shape of the electrodes can be accurately determined, and the shortest path between the pair of electrodes can be more accurately found.

The emission position-detecting method of the discharge lamp of the present invention is an emission position-detecting method of the discharge lamp which is lightened by a discharge generated between the pair of opposing electrodes, and is characterized in that a micro-discharge is generated between the pair of electrodes of the discharge lamp, and the imaging information on this micro-discharge path is obtained, and based on this imaging information, the center point of the micro-discharge path is detected as the emission position of the discharge lamp.

According to this invention, the imaging information on the micro-discharge path generated between the pair of electrodes is obtained, and the center point of the micro-discharge path is found from this imaging information, and this center point is found as the emission position of the discharge lamp.

Since the micro-discharge is used in this way, the emission position of the discharge lamp can be found in a state of temperatures of the discharge lamp being hardly raised.

When the discharge lamp is placed on the reflector constituting, for example, a lamp unit as described above, first, the emission position of the discharge lamp is found by the method of the present invention, and if the positioning of the discharge lamp and the reflector is performed so that the emission position found in this way comes to the focal position of the reflector, that is, the luminance of the emission light of the reflector becomes approximately the maximum, then the alignment adjustment of the lamp unit can be performed with the temperatures of the discharge lamp being hardly raised.

Accordingly, when the positioning work of the discharge lamp and the reflector is performed, since the micro discharge is used, the time required from when the discharge lamp is lightened till when its luminance is stabilized is dispensed with. In addition, since the temperatures of the discharge lamp are hardly raised, it is no longer necessary to wait until the discharge lamp cools down after the position adjustment is performed, thereby improving the working efficiency.

In the emission position-detecting method of the discharge lamp of the present invention, it is desirable that the micro-discharge is generated plural times to find a plurality of the micro discharge paths, and respective center points of the plurality of micro-discharge paths are detected, and a mean place of a plurality of these center points is found as the emission position of the discharge lamp.

According to this invention, since respective center points are detected from a plurality of micro-discharge paths and the mean place of a plurality of these center points is found as the emission position of the discharge lamp, the emission position of the discharge lamp can be more accurately found.

In order to achieve the above-described object, a positioning method of the discharge lamp and the reflector of the present invention adopt the following method.

The positioning method of the discharge lamp and the reflector of the present invention is a positioning method of the discharge lamp and the reflector having a focal position and reflecting the light reflected from the discharge lamp, and is characterized in that the emission position of the discharge lamp is detected by using any one of the above-described emission position-detecting methods of the discharge lamp, and the emission position of the discharge lamp is placed at the focal position of the reflector.

According to this invention, the emission position of the discharge lamp is detected by using any one of the above-described emission position-detecting methods of the discharge lamp, and the positioning of the discharge lamp and the reflector is performed so that the emission position found in this way comes to the focal position of the reflector.

Accordingly, when the positioning work between the discharge lamp and the reflector is performed, the time required from when the discharge lamp is lightened till when its luminance is stabilized is dispensed with. In addition, it is no longer necessary to wait until the discharge lamp cools down after the position adjustment is performed, thereby improving the working efficiency.

The positioning method of the discharge lamp and the reflector of the present invention is a positioning method of the discharge lamp and the reflector, which performs the positioning of the discharge lamp and the reflector reflecting the light ray emitted from this discharge lamp, and is characterized by comprising: a detecting work step of detecting the emission position of the discharge lamp by using any one of the above-described emission position-detecting methods of the reflector; a fixing work step of fixing the discharge lamp and the reflector to a fixing member respectively in a mutually independent state; and an adjusting step of adjusting a mounting position of the discharge lamp and/or the reflector to the fixing member.

According to this invention, for example, the reflector is fixed to the fixing member in advance, and the emission position of the discharge lamp is detected by using any one of the above-described emission position-detecting methods of the discharge lamp. Based on the emission position of the discharge lamp thus found, a mounting position of the discharge lamp to the fixing member is adjusted, and the positioning of the discharge lamp and the reflector is performed By so doing, when the positioning work of the discharge lamp and the reflector is performed, the time required from when the discharge lamp is lightened till when its luminance is stabilized is dispensed with, and at the same time it is no longer necessary to wait until the discharge lamp cools down after the position adjustment is performed, thereby improving the working efficiency.

In the positioning method of the discharge lamp and the reflector of the present invention, it is desirable that the imaging information on the pair of electrodes is obtained plurally from different imaging directions, and from among the pair of electrodes, the misaligned direction of the other electrode with respect to either one of the electrodes is detected.

According to this invention, plural pieces of imaging information are obtained from different imaging directions, and based on these pieces of imaging information, an axial misaligned direction of the pair of electrodes is detected, and, for example, if this axial misaligned direction is aligned to a predetermined direction, then the luminance condition of the lamp unit, which is constituted by the discharge lamp and the reflector, can be improved.

Incidentally, to which direction the axial misaligned direction should be aligned may be decided according to the optical system in which the lamp unit is used In order to achieve the above-described object, the emission position-detected apparatus of the present invention comprises the following constitution.

The emission position-detecting apparatus of the present invention is an emission position-detecting apparatus of the discharge lamp lightened by the discharge generated between a pair of opposing electrodes, and is characterized by comprising: discharge lamp holding means for holding the discharge lamp; imaging means for obtaining the imaging information on the pair of electrodes of the discharge lamp held by this discharge lamp holding means; estimated discharge path detecting means for detecting the shortest path coupling between the pair of electrodes based on the imaging information; and emission position calculating means for finding a coordinate value of the center point of the shortest path detected by this estimated discharge path detecting means as the coordinate value of the emission position of the discharge lamp.

According to this invention, first, the imaging information on a pair of electrodes is obtained by the imaging means in a state of the discharge lamp being held by the discharge lamp holding means. Subsequently, the shortest path coupling between the pair of electrodes is detected from this imaging information by the estimated discharge path detecting means, and a coordinate value of the center point of the shortest path that is, a coordinate value of the emission position of the discharge lamp is found by the emission position calculating means.

Since the discharge path generated between the pair of electrodes of the light source lamp usually approximately matches the shortest path coupling between the pair of electrodes, if the position of the center point of the shortest such path is found, then the emission position of the discharge lamp can be found. Since the shortest path coupling between the pair of electrodes and the emission position of the light source lamp are found from the imaging information, the emission position of the discharge lamp can be found without lightening the discharge lamp.

When the discharge lamp is placed on the reflector constituting for example, a lamp unit as described above, first, the emission position of the discharge lamp is found by the method of the present invention, and if the positioning of the discharge lamp and the reflector is performed so that the emission position found in this way comes to the focal position of the reflector, that is, the luminance of the emission light of the reflector becomes approximately the maximum, then the alignment adjustment of the lamp unit can be performed without lightening the discharge lamp.

Accordingly, when the positioning work of the discharge lamp and the reflector is performed, since the lightening of the discharge lamp is made unnecessary, the time required from when the discharge lamp is lightened till when its luminance is stabilized is dispensed with, and at the same time it is no longer necessary to wail until the discharge lamp cools down after the position adjustment is performed, thereby improving the working efficiency.

In order to achieve the above-described object, a positioning apparatus of the present invention comprises the following constitution.

The positioning apparatus of the present invention is a positioning apparatus for positioning the discharge lamp lightened by a discharge generated by a pair of opposing electrodes and the reflector reflecting the light ray emitted from this discharge lamp, and is characterized by comprising: the above-described emission position-detecting apparatus; reflector holding means for holding the reflector; and relative displacement means for relatively displacing the discharge lamp with respect to the reflector held by this reflector holding means.

According to this invention, first, the emission position of the discharge lamp is detected by using the above-described emission position-detecting apparatus. Subsequently, based on this detected emission position, the discharge lamp is relatively displaced by the relative displacement means with respect to the reflector held by the reflector holding means so that the positioning of the discharge lamp and the reflector is performed.

Accordingly, when the positioning work of the discharge lamp and the reflector is performed, since the lightening of the discharge lamp is made unnecessary, the time required from when the discharge lamp is lightened till when its luminance is stabilized is dispensed with, and at the same time it is no longer necessary to wail until the discharge lamp cools down after the position adjustment is performed, thereby improving the working efficiency.

BRIEF DESCRIPTION OF DRAWINGS

FIG. 25 is a sectional view showing the essential portion of the fourth embodiment of the present invention;

BEST MODE FOR CARRYING OUT THE INVENTION

Hereinafter, first and second embodiments of the present invention will be described with reference to the drawings.
[Forst Embodiment]

(1. Overall Explanation of Optical Unit in Projector)

Figure 1:
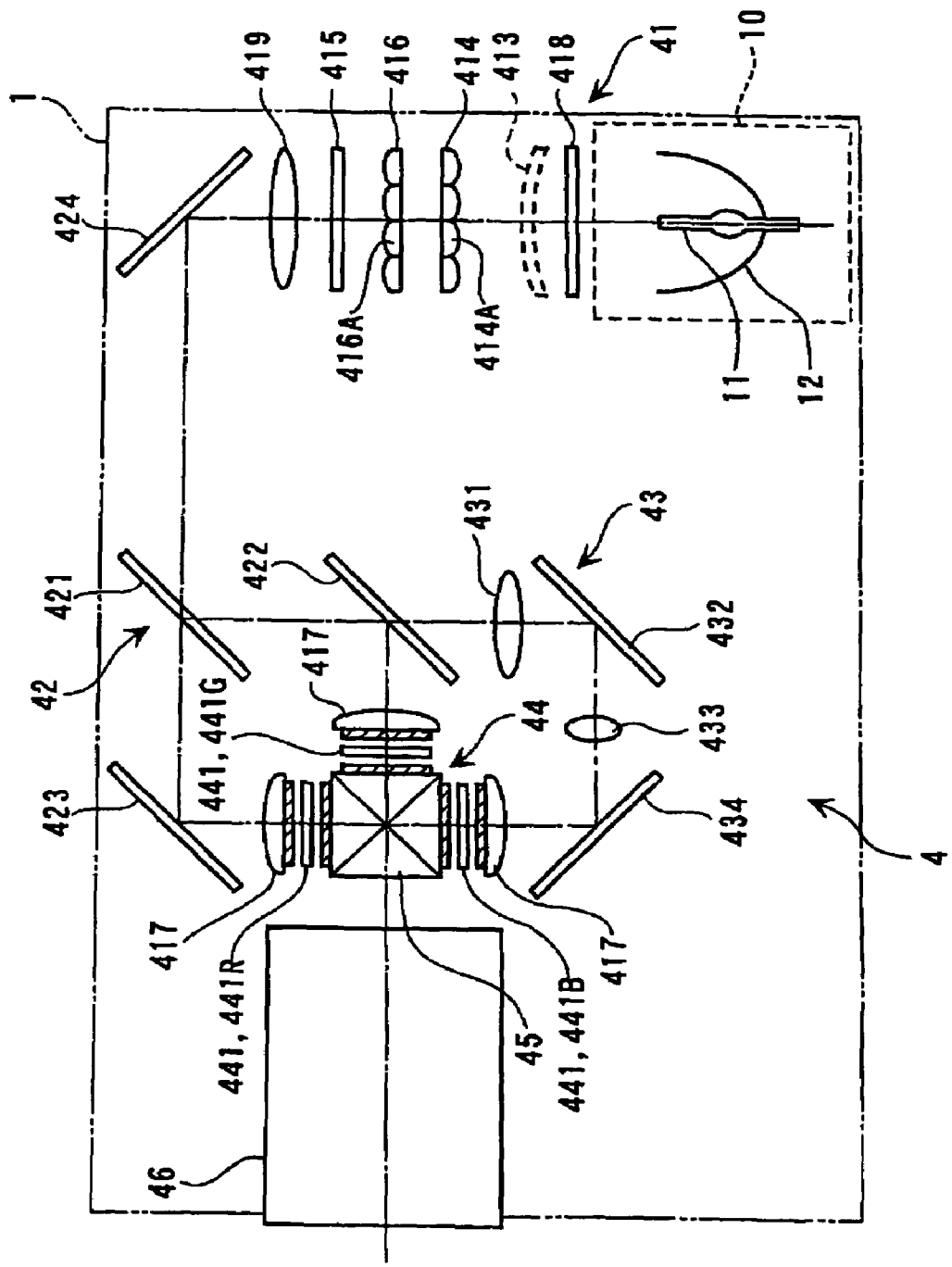
FIG. 1 is a top view schematically showing an optical system of a projector according to a first embodiment of the present invention.

In FIG. 1, there is schematically shown an optical unit 4 used for a projector 1 in a first embodiment of the present invention.

The optical unit 4 is a unit which optically processes a light flux emitted from a light source and forms an optical image corresponding to image information, and comprises an integrator illumination optical system 41; a color separation optical system 42; a relay optical system 43; an electro optic device 44; a cross dichroic prism 45; and a projector lens 46.

The integrator illumination optical system 41 is an optical system 44 for providing a light flux to an image forming area of three pieces of liquid crystal panels 441 (shown as liquid crystal panels 441R, 441G, 441B for each color light), and comprises a lamp unit 10 which is a light source apparatus; a UV filter 418; a first lens array 414; a second lens array 416; a polarized light conversion element 415; a superposing lens 419; and a reflecting mirror 424.

From among those described as above, the lamp unit 10 has a discharge lamp 11 which is a light source lamp to emit a radial light ray, a reflector 12 reflecting the light emitted from this discharge lamp 11, and a lamp housing (not shown) in which these discharge lamp 11 and reflector 12 are mounted. As the discharge lamp 11, there is often used a lamp sealed inside with mercury.

Incidentally, an ellipsoidal mirror is sometimes used for the reflector 12. In this case, it is desirable that a parallelized lens 413 is placed between the UV filter 418 and the first away lens 414 so as to compensate for the reflected light as shown by a dotted line.

Incidentally, such a structure of the lamp unit 10 will be described in details later.

The first array lens 414 has a constitution in which small lenses 414A having approximately a rectangular profile seen from an optical axis are arrayed in a matrix shape. Each small lens 414A divides the light flux, which is emitted from the discharge lamp 11 so as to pass through the UV filter 418, into a plurality of partial fluxes. The profile shape of each small lens 414A is set so as to approximately resemble the shape of the image forming area of the liquid crystal panel 441. For example, if an aspect ratio of the image forming area of the liquid crystal panel (a ratio of horizontal and vertical dimensions) is 4:3, then the aspect ratio of each small lens 414A is also set to 4:3.

The second lens array 416 has approximately a similar constitution as that of the first array lens 414, and has the constitution in which the small lenses 416A are arrayed in a shape of a matrix. This second array lens 416 has a function to image-form an image of each small lens 414A of the first array lens 414 on the liquid crystal panel 441 in conjunction with the superposing lens 419.

The polarized light conversion element 415 is placed between the second array lens 416 and the superposing lens 419, and at the same time converts the light from the second array lens 416 into one kind of a polarized light, thereby improving the use efficiency of the light by the electro optic device 44.

Specifically, each partial light converted into one kind of the polarized light by the polarized light conversion element 415 is approximately superposed on the liquid crystal panels 441R, 441G, 441B of the electro optic device by the superposing lens 419. In the projector 1 (electro optic device 44) of the present embodiment using the liquid crystal panel 441 of the type which modulates the polarized light, since only one kind of the polarized light can be used, approximately half of the light from the discharge lamp 11 which emits other kinds of random polarized lights is not used.

Hence, by using the polarized light conversion element 415, all the emitted light from the discharge lamp 11 is converted into one kind of the polarized light, thereby improving the use efficiency of the light by the electro optic device 44. Incidentally, such polarized light conversion element 415 is introduced, for example, in Japanese Patent Laid Open No. 8-304739 and the like.

The color separation optical system 42 comprises two pieces of the dichroic mirrors 421, 422 and the reflecting mirror 423, and has a function of separating a plurality of partial light fluxes emitted from the integrator illumination optical system 41 into color lights of tree colors of Red, Green, Blue by these dichroic minors 421, 422.

The relay optical system 43 comprises an incident side lens 431; a relay lens 433; and reflecting mirrors 432, 434, and has a function of guiding a blue color light from among the color lights separated by the color separation optical system 42 to the liquid crystal panel 441B.

Here, in the dichroic mirror 421 of the color separation optical system 42, a blue color light and a green color light of the light fluxes emitted from the integrator luminance optical system 41 are reflected, and at the same time a red color light transmits. The red color light transmitted by the dichroic mirror 421 is reflected from the reflecting mirror 423, and reaches the liquid crystal panel 441R for the red color by passing through a field lens 417. This field lens 417 converts each partial light flux emitted from the second array lens 416 into a light flux parallel with its center axis (primary light ray). The same is applied to the field lens 417 provided in front of the other liquid crystal panels 441G, 441B.

From among the blue color light and the green color light reflected by the dichroic mirror 421, the green color light is reflected from the dichroic mirror 422 and reaches the liquid crystal panel 441G for the green color by passing through the field lens 417. On the other hand, the blue color light transmits the dichroic mirror 422 so as to pass through the relay optical system 43 and, further, passes through the field lens 417 to reach the liquid crystal panel 441B. Incidentally, the reason why the relay optical system 43 is used for the blue color light is because, since the length of the optical path of the blue color light is longer than the length of the optical path of other color lights, the deterioration of the use efficiency of the light caused by the diffusion of the light and the like is prevented. That is, this is because the partial light flux incident on the incident side lens 431 is transmitted to the field lens 417 as it is.

The electro optic device 44 comprises three pieces of the liquid crystal panels 441R, 441G, 441B which become an optical modulator, and these panels use, for example, a polysilicon TFT as s switching element, and each color light separated by the color separation optical system 42 is modulated corresponding to the image information by these three pieces of the liquid crystal panels 441R, 441G, 441B so as to form an optical image.

The cross dichroic prism 45 forms a color image by synthesizing a modulated image for each color light emitted from three pieces of the liquid cry panels 441R, 441G, 441B. Incidentally, a dielectric multi-layer film reflecting the red color light and a dielectric multi-layer film reflecting the blue color light are formed in the prism 45 approximately in an X letter shape along the interfaces of four pieces of right angle prisms, and three color lights are synthesized by these dielectric multi-layers films. The color image synthesized by the prism 45 is emitted from the projector lens 46 and projected and magnified onto the screen.

(2. Structure of Lamp Unit)

Figure 2:
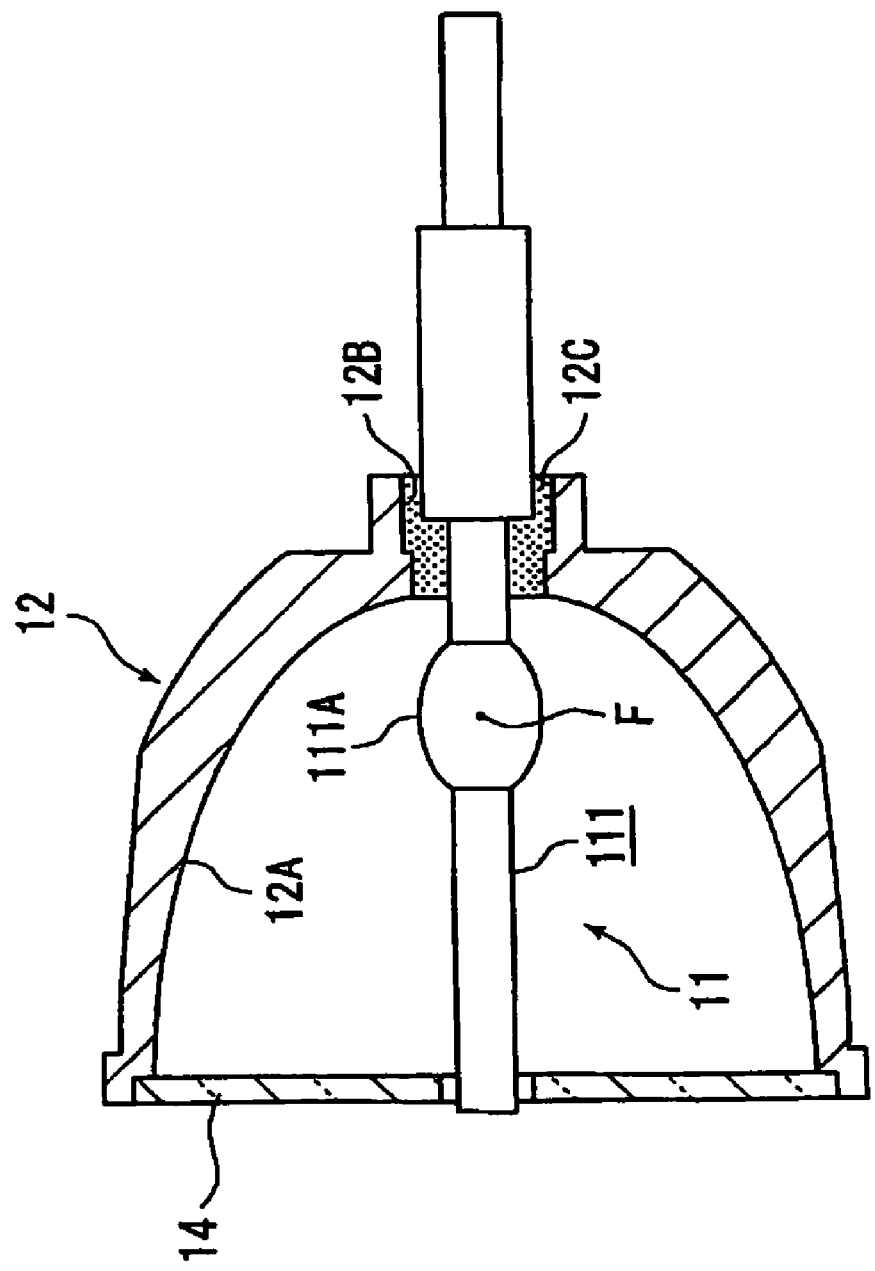
FIG. 2 is a sectional view showing a light source apparatus in the above first embodiment of the present invention.

The lamp unit 10 is housed inside a frame body (light guide) not shown of the projector 1, and, as shown in FIG. 2, is constituted by including the discharge lap 1, the reflector 12 which aligns and emits the light ray emitted from this discharge lamp 11, and a lamp housing not shown to which these discharge lamp 11 and the reflector 12 are mounted.

Figure 3:
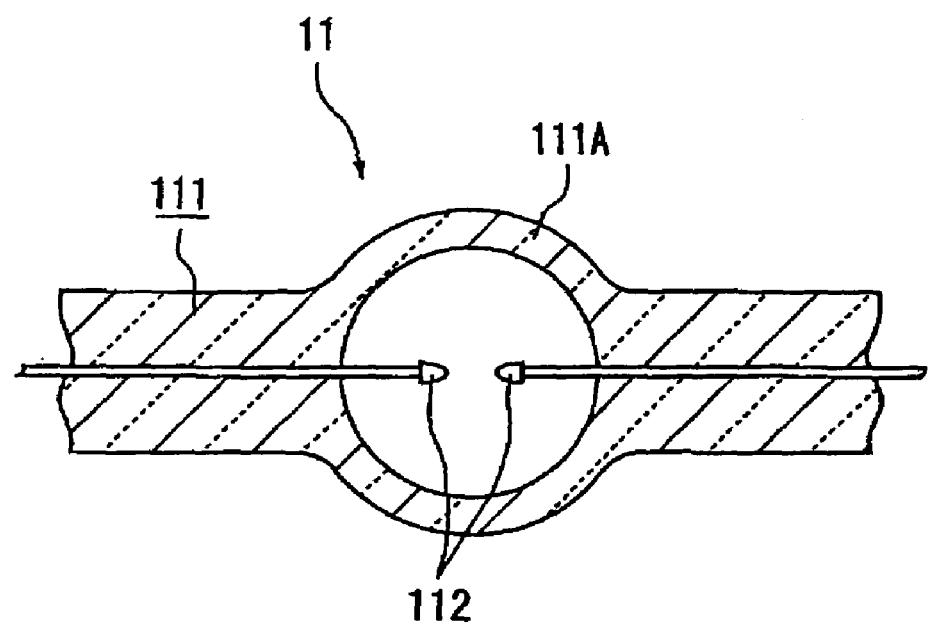
FIG. 3 is a sectional view showing a light source lamp in the above first embodiment of the present invention.

The discharge lamp 11, as shown in FIG. 3, comprises a main body 111 made of glass; and a pair of electrodes 112 housed inside this main body 111.

A center portion 111A of the main body 111 is bulged and hollow, and a slight amount of mercury is sealed inside the center portion 111A.

Figure 4:
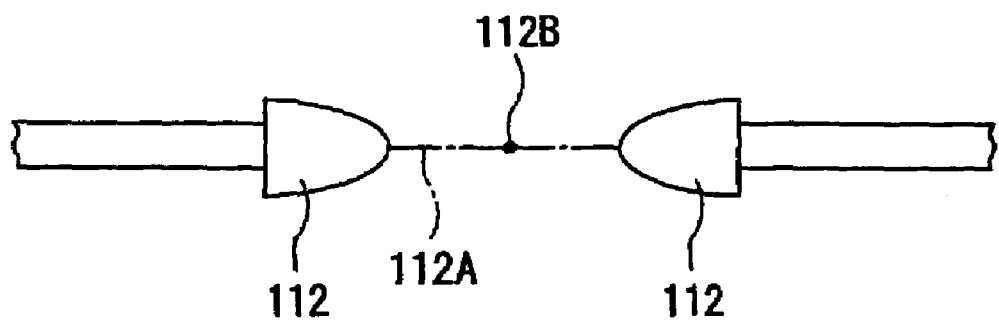
FIG. 4 is an enlarged view of a pair of electrodes of the light source lamp in the above first embodiment of the present invention.

A pair of electrodes 112 is opposed just inside this center portion 111A, and the discharge lamp 11 is lightened by a discharge between the pair of electrodes 112. Here, a point of approximately the center of a discharge path 112A generated between the pair of electrodes 112 as shown in FIG. 4 is taken as an emission position 112B of the discharge lamp 11. Incidentally, the emission position 112B of the discharge lamp 11 is approximately the center point of the emission of the discharge lamp 11.

Referring back to FIG. 2, the reflector 12 is formed in a cup shape, and is taken as a reflecting surface 12A formed in a parabolic shape, of which inner surface has a focal position F. When the light source is placed at the focal position F, the reflector 12 is allowed to reflect the light emitted from the light source and emit the parallel light Such reflector 12 has an opening at the left side in the drawing (light emitting side), and a bottom portion thereof is placed at the right side in the drawing.

An insertion hole 12B for inserting the discharge lamp 11 is formed in the center of the bottom portion of the reflector 12. The discharge lamp 11 is inserted into this insertion hole 12B, and the center portion 111A of the discharge lamp 11 is placed inside the reflector 12. After that, a bonding agent 12C such as cement and the like is filled in the inserting hole 121 so as to fix the discharge lamp 11 to the reflector 12.

On the other hand, a protection glass plate 14 is mounted on the opening of the reflector 12. In this way, the light emitting side of the reflector 12 is covered by the protection glass plate 14, so that fragments are not allowed to fly apart to the outside even when the discharge lamp 11 is burst by any chance.

When the lamp unit 10 having such a constitution is manufactured, a positioning work (alignment adjustment) is performed so that the physical relationship between the discharge lamp 11 and the reflector 12 becomes best adequate, that is, the focal position F of the reflector 12 approximately matches the emission position of the discharge lamp 11.

When the alignment adjustment of the discharge lamp 11 and the reflector 12 is performed, it is necessary to detect the emission position 112B of the discharge lamp 11 and the focal position F of the reflector 12, respectively. Among which, the detecting of the focal position of the reflector 12 is performed by using the focal position-detecting apparatus 3 shown in FIG. 5 and FIG. 6.

(3. Structure of Focal Position-detecting Apparatus of Reflector)

Figure 5:
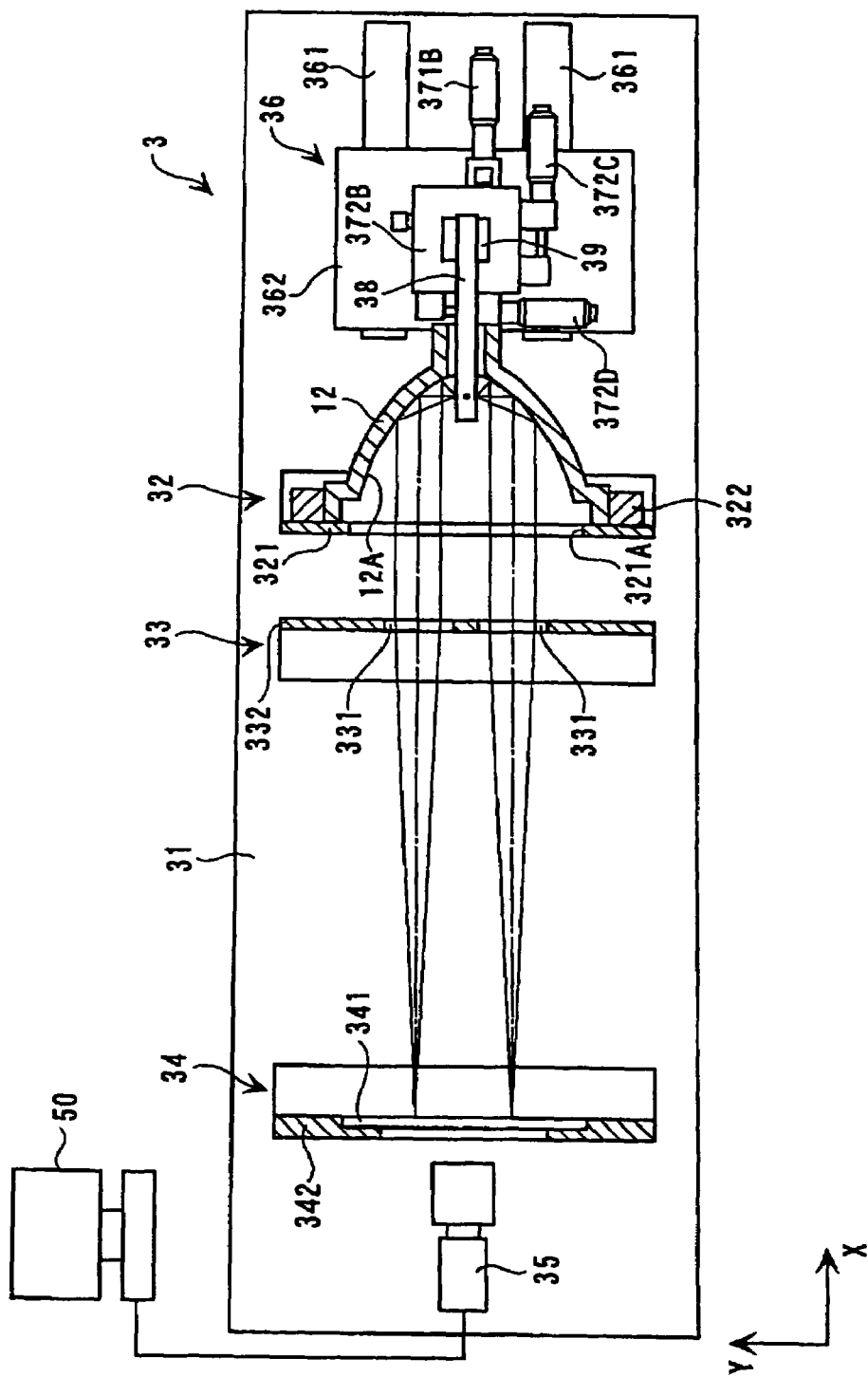
FIG. 5 is a top view showing a focal position-detecting apparatus in the above first embodiment of the present invention.
Figure 6:
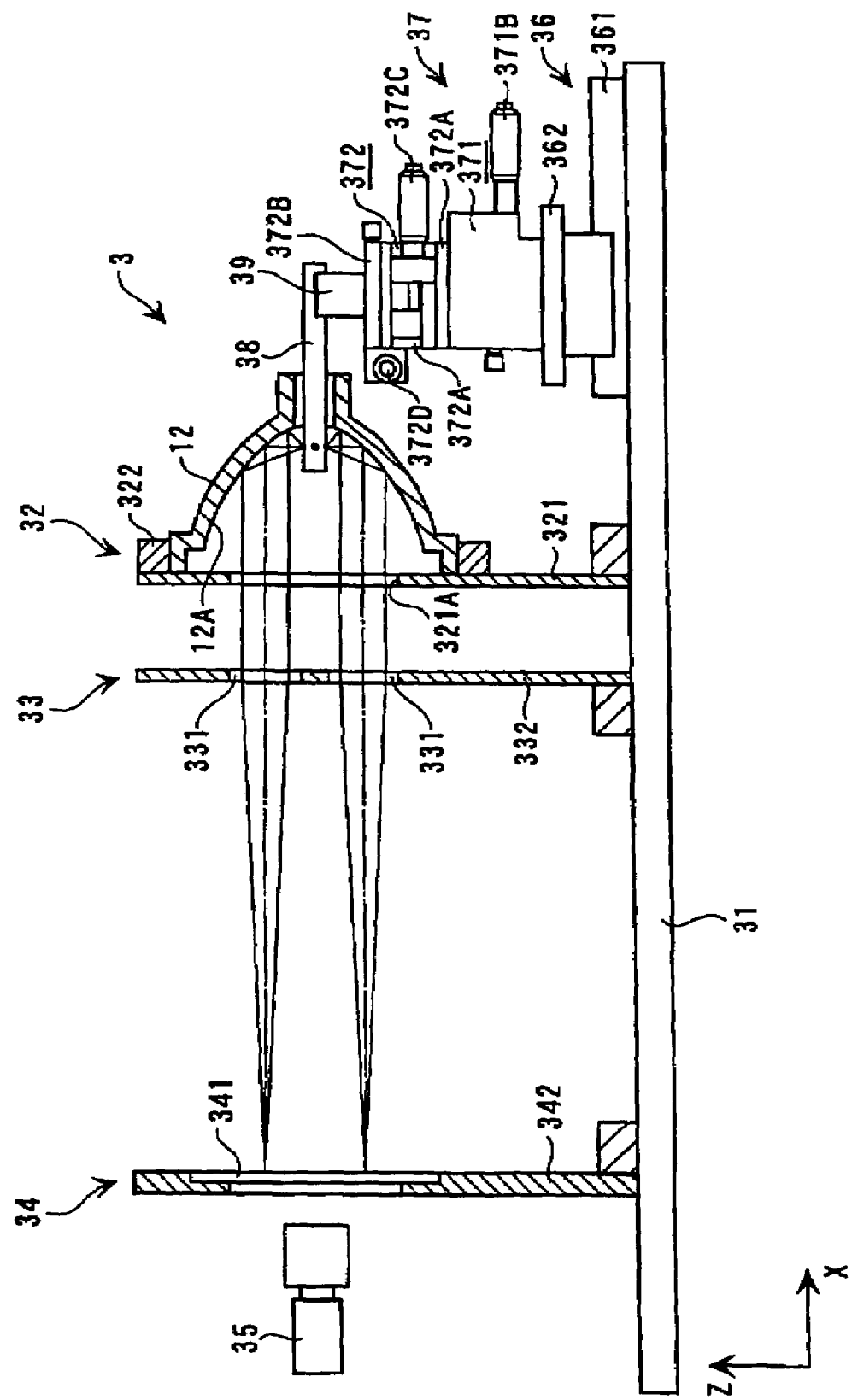
FIG. 6 is a side view showing the focal position-detecting apparatus in the above first embodiment of the present invention.

In FIG. 5, there is shown a top view of the focal position-detecting apparatus 3, and in FIG. 6, its side view, respectively.

This focal position-detecting apparatus 3 comprises a base 31 and, on this base 31, are placed reflector holding means 32, a condenser lens portion 33, a screen portion 34, a focal position-detecting camera 35 as reflected light information detecting means, a X direction moving mechanism 36 as a first relative displacement means and a position adjusting mechanism 37, and a focal position-detecting light source 38, respectively.

The reflector holding means 32 comprises a support plate 321 provided on a base 31, and the right side in the drawing of this support plate 321 is provided with a reflector holding member 322, on which an opening side of the reflector 12 is detachably mounted. Further, the support plate 321 is formed with a hole portion 321A for allowing the reflected light from the reflector to pass through at a position corresponding to the opening of the reflector 12.

The X direction moving mechanism 36 is constituted by including two pieces of X direction rails 361 which are provided on the base 31 and extend in parallel to the X direction, and a X direction table 362 which is slidably provided along the longitudinal direction (X direction) of these X direction rails 361.

The position adjusting mechanism 37 is constituted by including a Z direction fine adjusting mechanism 371 placed on the X direction table 362 and a XY direction fine adjusting mechanism 372 placed on the Z direction fine adjusting mechanism 371, and a focal position-detecting light source 38 is detachably mounted on the XY direction fine adjusting mechanism 372 through the discharge lamp holding means 39 which is the light source holding means.

These Z direction fine adjusting mechanism 371 and XY direction fine adjusting mechanism 372 may utilize mechanisms utilizing the prior art, and in the present embodiment, the following mechanisms are specifically used.

The Z direction fine adjusting mechanism 371 is constituted by including a Z stage 371A and a micrometer head 371B. The Z stage 37A is driven to a Z direction accompanied with the reciprocation of a spindle of the micrometer head 371B. Further, the XY direction fine adjusting mechanism 372 is placed on the Z stage 371A.

The XY direction fine adjusting mechanism 372 is constituted by including an X stage 372A, a Y stage 372B, an X direction micrometer head 372C and a Y diction micrometer head 372D. The X stage 372A and the Y stage 372B are driven to the X and Y directions respectively accompanied with the reciprocation of each spindle of each micrometer head 372C, 372D.

Incidentally, in the present embodiment, though the driving system of the Z direction fine adjusting mechanism 371 and the XY direction fine adjusting mechanism 372 is set to a manual system by using the micrometer heads 371B, 372C, 372D, the driving system may be set to an automatic system by using, for example, a stepping motor and the like.

Figure 7:
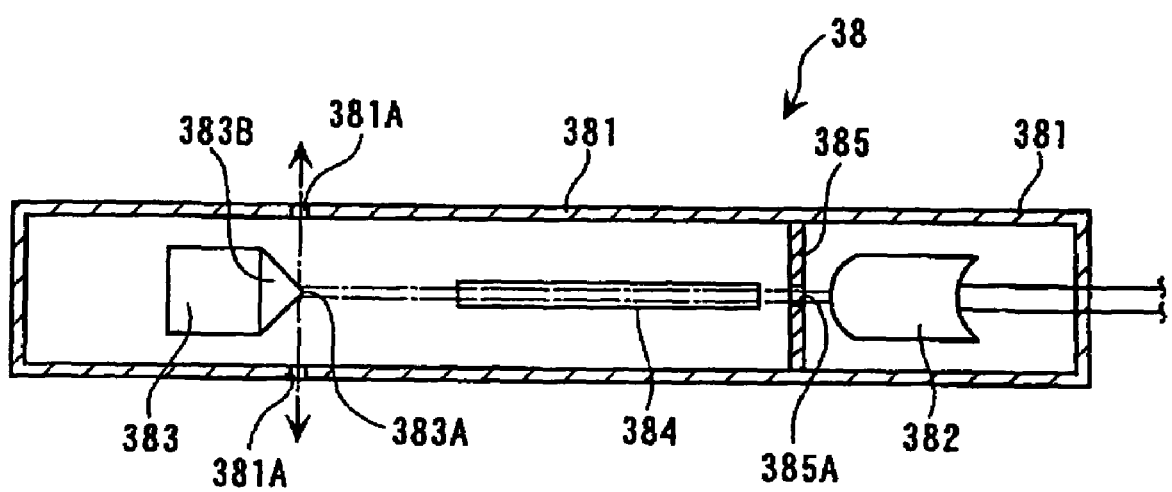
FIG. 7 is a sectional view showing the focal position-detecting apparatus in the above first embodiment of the present invention.
Figure 8:
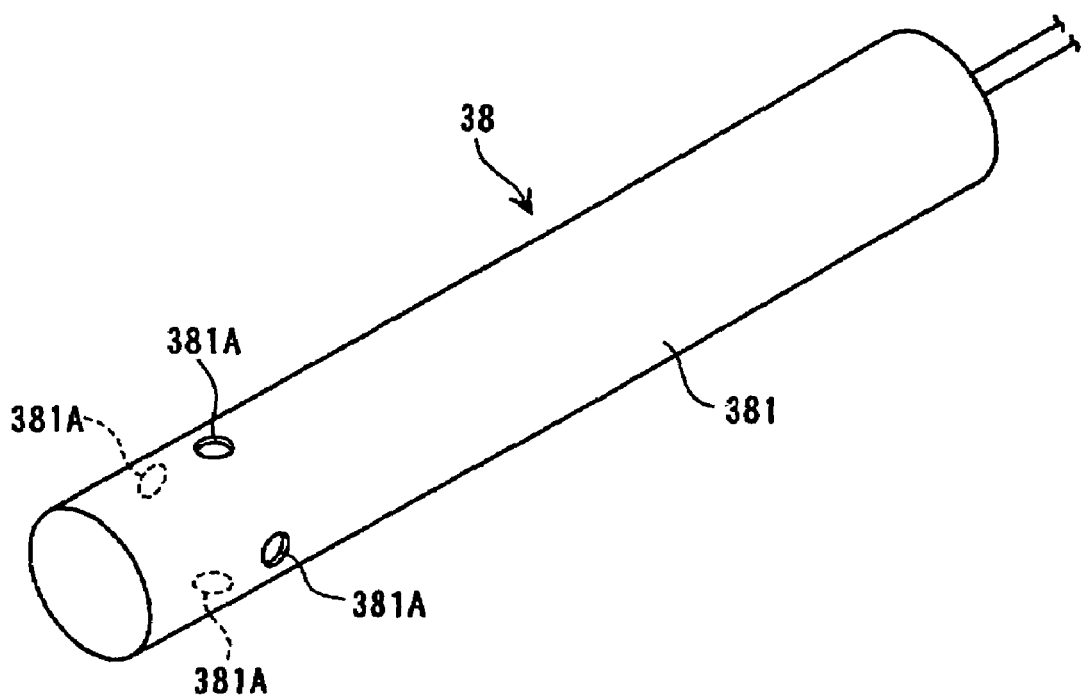
FIG. 8 is an oblique view showing the focal position-detecting apparatus in the above first embodiment of the present invention.

The focal position-detecting light source 38, as shown in FIG. 7 and FIG. 8, has a cylindrical housing 381 with both ends thereof closed. Inside this housing 381 at the right side in the drawing, an light emitting-diode 382 as on light emitting element, is provided, and at the left side in the drawing a reflecting prism 383 as a reflecting member is provided, the top end of which is formed approximately in a circular cone shape. An optical fiber cable 384 is provided between these light emitting diode 382 and reflecting prism 383.

In the interior of the housing 381, a partition wall 385 is provided between the light emitting diode 382 and the optical fiber cable 384, and a hole portion 385 having a diameter slightly smaller than the diameter of the optical fiber cable 384 is formed in this partition wall 385A. Incidentally, the housing 381 and the partition wall 385 are formed of a non-transmissive member.

Further, on the peripheral surface of the housing 381, four hole portions 381A for allowing the reflected light from the reflecting prism 383 to emit to the outside are provided along the peripheral direction of the housing 381. These four holes 381A are mutually spaced at intervals of 90°.

The light emitting diode 382 is a light-emitting element, which emits the light when applied with a voltage, and has a characteristic of having no generation of heat when emitting the light.

Figure 9:
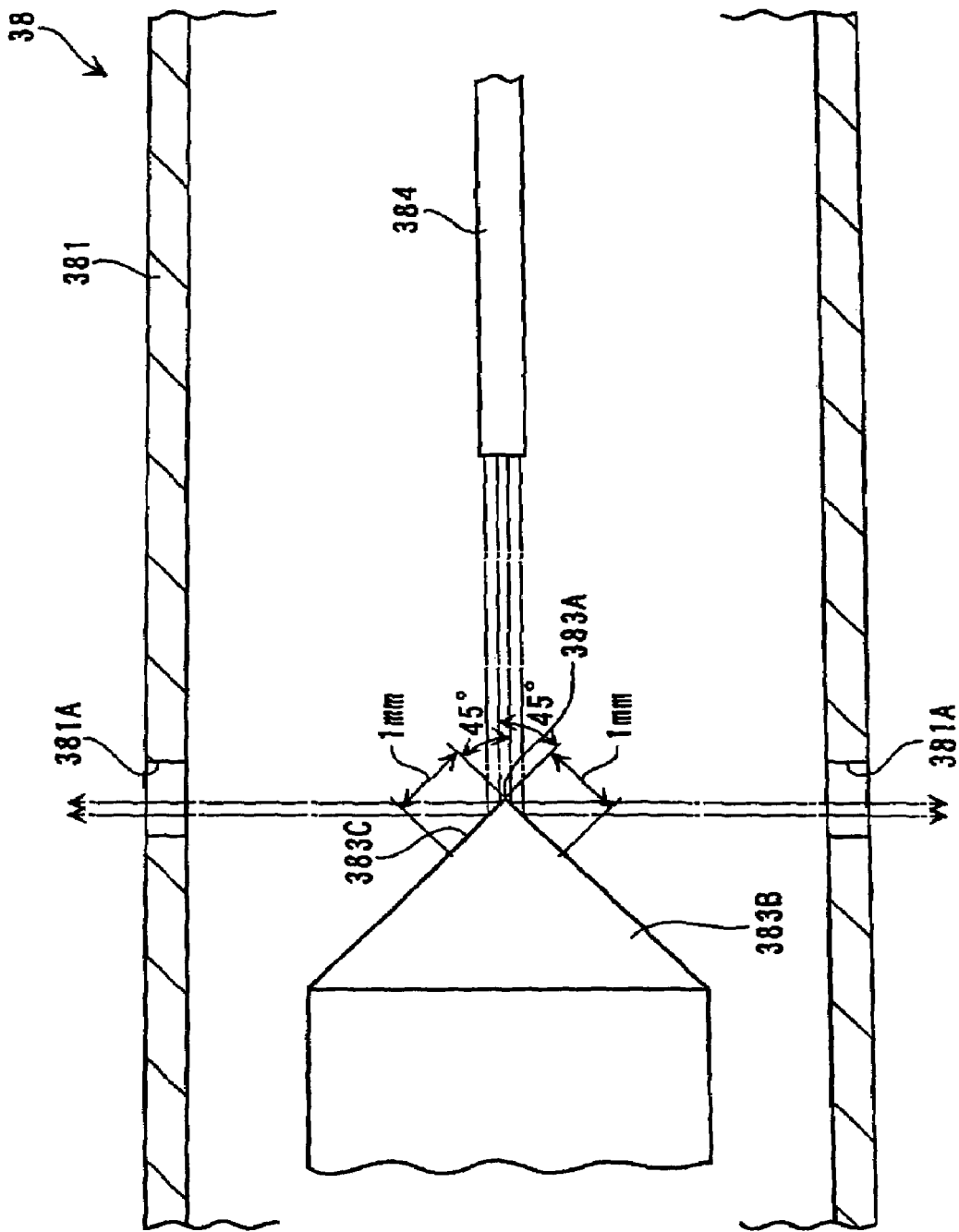
FIG. 9 is a sectional view showing an enlarged portion of the focal position-detecting apparatus in the above first embodiment of the present invention.

The reflecting prism 383 is formed in a circular cone shape, the top end of which has an apex 383A and a conical surface 383B. This top end is placed so as to oppose to the light-emitting diode 382. As magnified and shown in FIG. 9, an angle made by the conical surface 383B and an optical path of the light emitted from the optical fiber cable 384 is approximately 45°, and a reflecting surface 383C polished so as to be able to reflect the light from the optical fiber cable 384 is formed in the vicinity portion of the apex 383A of the conical surface 383B. Incidentally, in the present embodiment, the length along the inclined direction of the conical surface 383B of the reflecting surface 383C is taken as 1 mm. The above-described four hole portions 381A are placed at the position corresponding to this reflecting surface 383C.

The optical fiber cable 384 is small in a diameter and, in the present embodiment, for example, the diameter is taken as 0.5 mm. From among the lights emitted from the light emitting diode 382, part of the lights passing through the hole portion 385A of the partition wall 385 is incident on the right end of the optical fiber cable 384, and this light is emitted toward the reflecting prism 383 from the left side by passing inside the optical fiber cable 384.

In the focal position-detecting light source 38 having such a constitution, part of the light emitted from the light emitting diode 382 passes through the hole portion 385A of the partition wall 385 and the optical fiber cable 384 in that order, and thereafter, is reflected on the conical surface 383B (reflecting surface 383C) of the reflecting prism 383 and passes through the hole portion 381A of the housing 381 so as to be emitted to the outside.

The light from the light emitting diode 382 passes through the hole portion 385A of the partition wall 385 and the optical fiber cable 384 so that it can reach the conical surface 383B of the reflecting prism 383 without diffusing much. In this way, since the light can be reflected at a portion much nearer to the apex 383A of the conical surface 383B of the reflecting prism 383, the reflected light reflected on the reflecting prism 383 can be taken as the light emitted from the apex 383A of the reflecting prism 383, so that the apex 383A of the reflecting prism 383 can be taken as a point of a point light source.

In such focal position-detecting light source 38, the light is emitted to four directions from the four hole portions 381A of the housing 381, and this light is allowed to be reflected on the reflecting surface of the reflector 12 and incident on a condenser lens portion 33 when the focal point detecting light source 38 is inserted inside the reflector 12.

Figure 10:
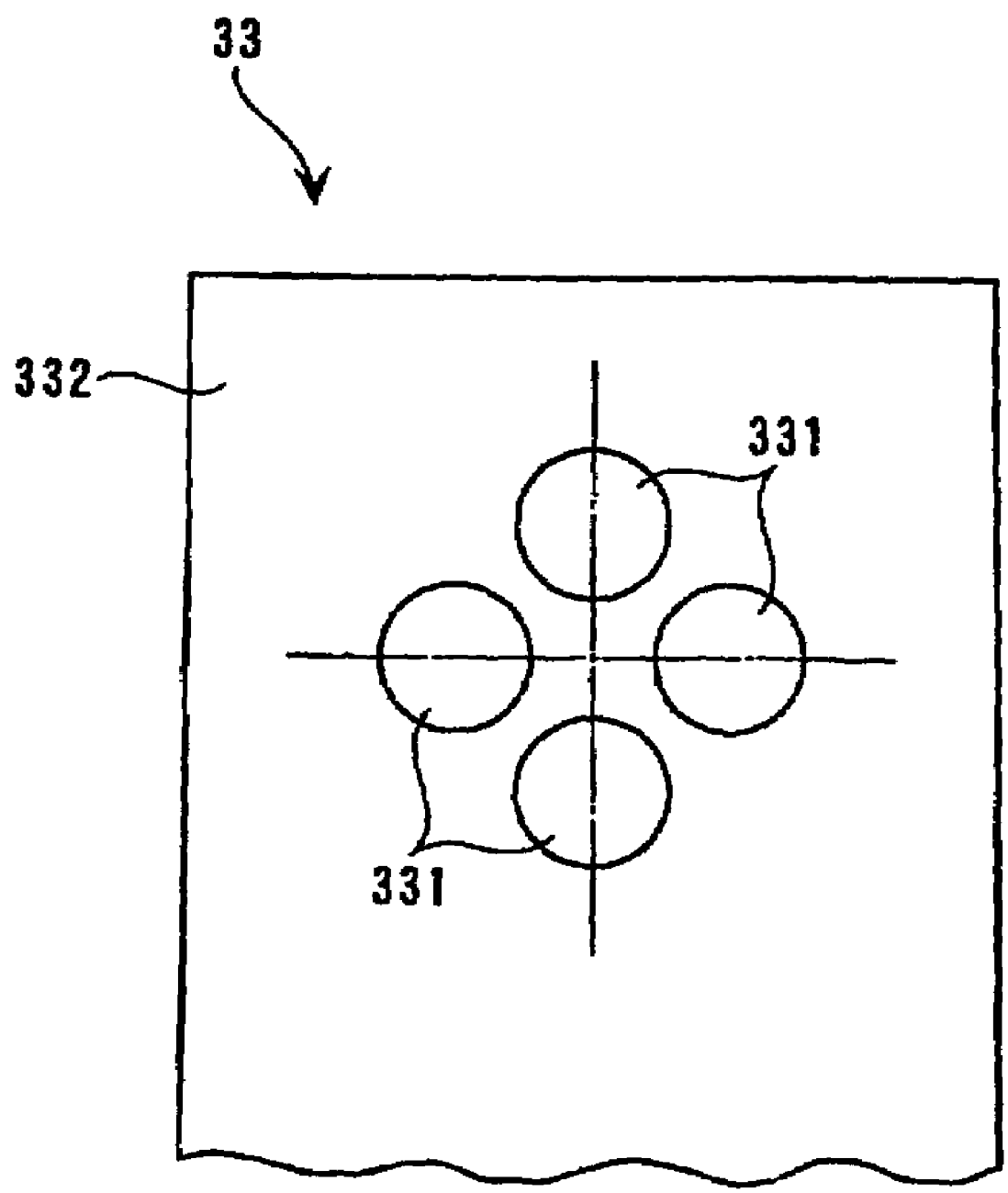
FIG. 10 is a front view showing a focal lens portion in the above first embodiment.

The condenser lens portion 33, as shown in FIG. 10, is constituted by including four pieces of the condenser lens 331 and a condenser lens holding member 332 provided on the base 31 to hold the four pieces of the condenser lens 331.

The four pieces of the condenser lens 331 are placed on each optical path of the light emitted in four directions from the focal position-detecting light source 38 and is reflected by the reflector 12.

The light, which passes through the condenser lens 331, is allowed to be projected onto the screen 341 of the screen portion 34.

Figure 11:
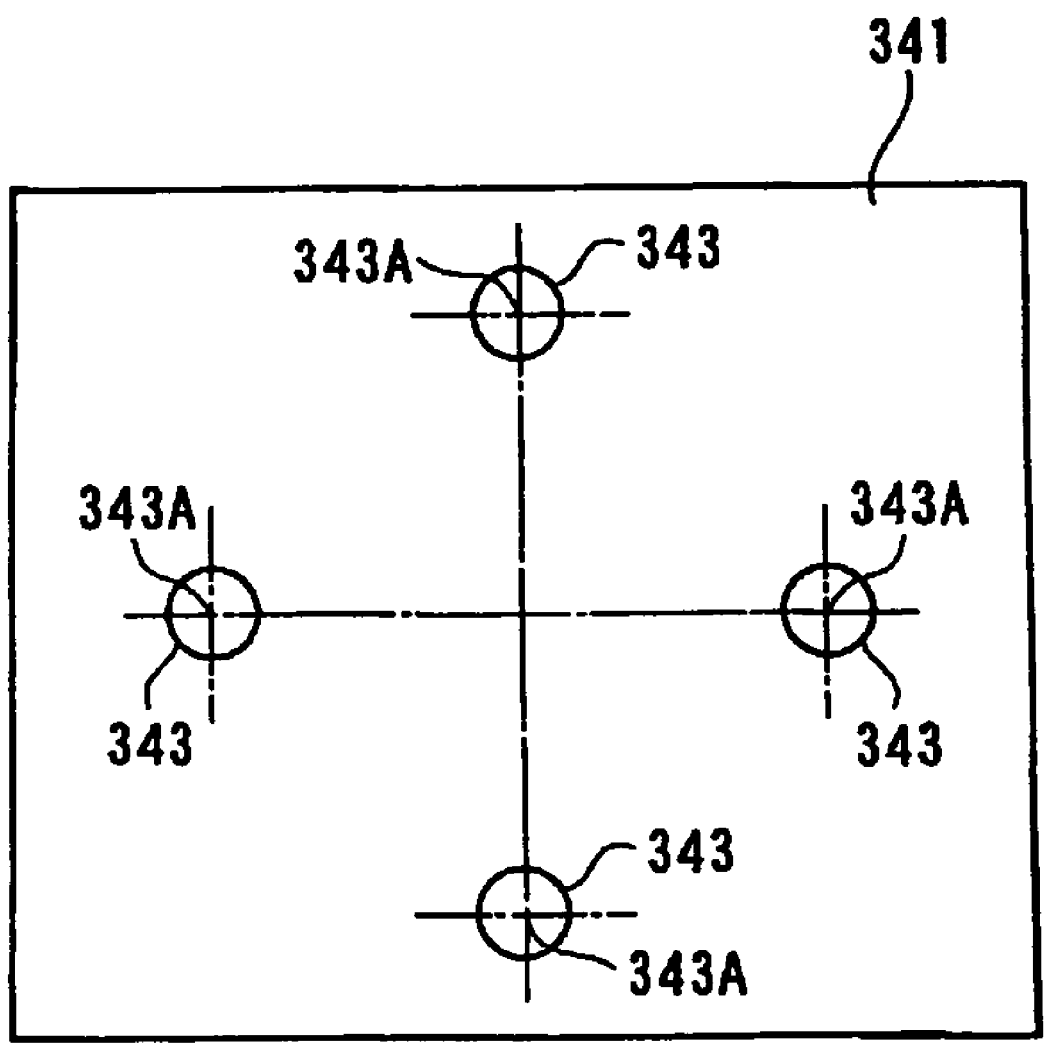
FIG. 11 is a front view showing a screen in the above first embodiment.

The screen portion 34, as shown also in FIG. 11, is constituted by including the screen 341 made of ground-glass and a screen holding member 342, which is provided on the base 31 and holds the screen 341.

The screen 341 and the condenser lens 331 are spaced at a predetermined distance, and this predetermined distance is set such that the light emitted from the condenser lens 331 is condensed just on the screen 341 when the parallel light is incident on the condenser lens 331.

Specifically, when the apex 383A of the reflecting prism 383 of the focal position-detecting light source 38 is placed approximately at the focal position F of the reflector 12, the light, which passes through each condenser lens 331, is set at a dance in which an image is formed on the screen 341. That is, when the focal position-detecting light source 38 is placed at a best adequate position, four pieces of the image having a top end-pointed shape of the reflecting prism 383 are projected onto the screen 341 (see FIG. 12).

In the screen 341, as shown in FIG. 11, an approximately circular marking 343 is given to the respective places where the above-described four images having the top end-pointed shape of the reflecting prism 383 are projected, and the center point 343A of each marking 343 is taken as the position where the apex of the image of the top end-pointed shape of the reflecting prism 383 reflected on the screen 341 comes. Incidentally, even when the focal position-detecting light source 38 is placed approximately at the focal position F of the reflector 12, in the case where the shape of the reflecting surface 12A of the reflector 12 or the conical, shape of the top end of the reflecting prism 383 is deviated from an ideal shape of designing respectively, the apex of the image having the top end-pointed shape of the reflecting prism 383 reflected on the screen 341 is sometimes shifted from the position of the center point 343A of the marking 343.

Figure 12:
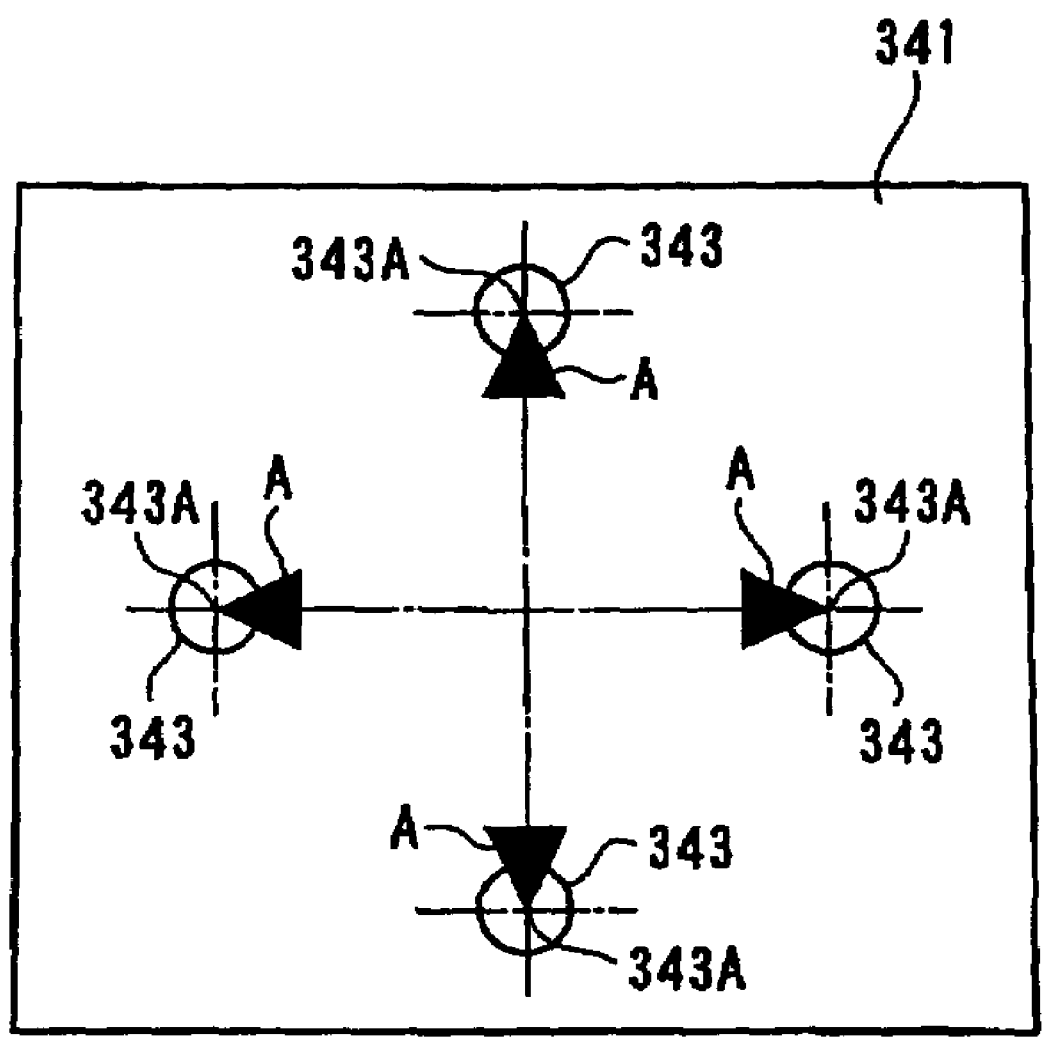
FIG. 12 is a front view showing images projected onto the screen in the above first embodiment.

In such screen 341, in the case where the focal position-detecting light source 38 is placed approximately at the focal position F of the reflector 12, since the parallel light is emitted from the reflector 12, four pieces of the image A of the reflecting prism 383 having non-blurred top end-pointed shape are projected onto the screen as shown in FIG. 12.

Figure 13:
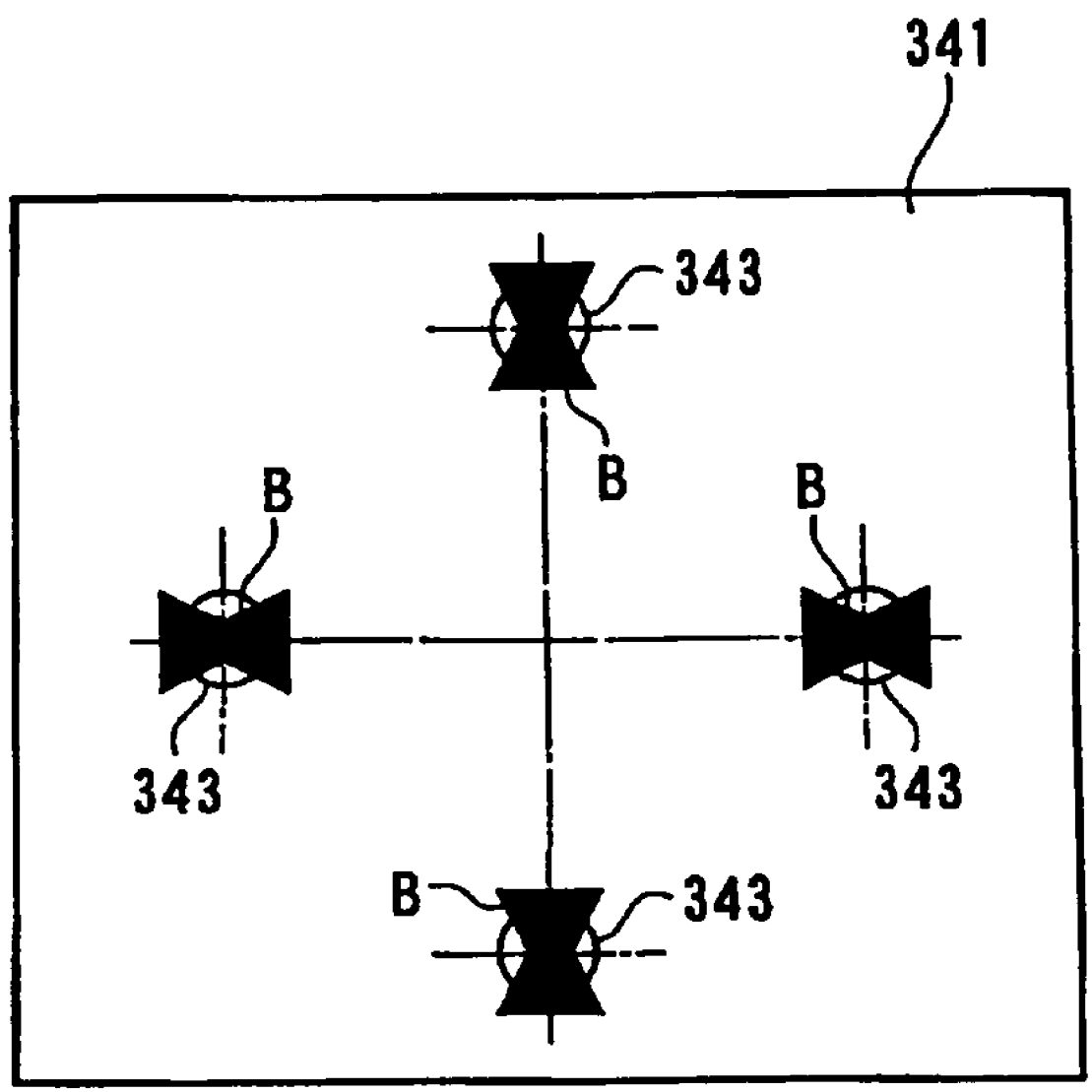
FIG. 13 is a front view showing other images projected onto the screen in the above first embodiment.

On the other hand, in the case where the focal position-detecting light source 38 is placed by shifting from the focal position F of the reflector 12, since the parallel light is not emitted from the reflector 12, the light emitted from the condenser lens 331 is not condensed on the screen 341, and four pieces of the image B having a blurred top end-pointed shape of the reflecting prism 383 are projected onto the screen as shown in FIG. 13.

The focal position-detecting camera 35 is a so-called CCD (Charge Coupled Device), and is placed at the opposite side (at the left side in FIGS. 5, 6) of the light incident side (at the right side in FIGS. 5, 6) of the screen 341, and detects the image (projected image) projected onto the screen 341 so as to output it as an electrical signal. This focal position-detecting camera 35 comprises a zoom focusing mechanism in order to detect the projected image with a high degree of accuracy, and can freely adjust the zoom focusing by a remote control.

Incidentally, though the present embodiment is constituted such that the four images projected onto the screen 341 are detected simultaneously by one set of the focal position-detecting camera 35, four sets of the focal position-detecting camera may be provided so as to detect each image by each camera Such focal position-detecting camera 35 is electrically connected to a computer 50 (FIG. 5) comprising a CPU and a storage unit, and the processing of the imaging information obtained by the focal position-detecting camera 35 is performed by this computer 50.

Specifically, the computer 50 discriminates whether or not the projected image obtained by the focal position-detecting camera 35 is a blurred image.

As for a discriminating method of the projected image, though various kinds of methods are considered, in the present embodiment, the following two methods can be cited as examples.

A first method can be cited as a method using pattern recognition. This is a method in which an ideal shape (approximately triangle shape in the present embodiment) of the projected image of the reflecting prism 383 projected onto the screen 341 is stored in advance as a pattern shape by the memory apparatus of the computer 50, and when a mutual difference is smaller by comparing this pattern shape to the shape of the projected image obtained by the focal position-detecting camera 35, the focal position-detecting light source 38 is regarded as being placed at the focal position F of the reflector 12. Incidentally, more blurred the projected image is, more larger the difference is between the image and the pattern shape.

A second method can be cited as a method using the luminance of the image. In the information on the projected image from the focal position-detecting camera 35, when the reflected light is projected onto the screen 341, the luminance value of a part in which the image is formed becomes smaller in contrast to other parts. By using this set, in the marking 343 of the screen 341, when the number of pixels having the luminance values not more than a predetermined value is the fewest, the focal position-detecting light source 38 is regarded as being placed at the focal position F of the reflector 12. Incidentally, in the present embodiment, the luminance value means a density value of an image signal obtained from the focal position-detecting camera 35, and in the present embodiment, it shows that smaller the density is, darker the image is, and larger the density is, paler the image is. Accordingly, in the marking of the screen 341, more blurred the projected image is, more larger the ratio of a part is, where the image is formed, and therefore, the number of pixels having the luminance values not more than a predetermined value is increased.

(4. Detecting Work of Focal Position F)

Figure 14:
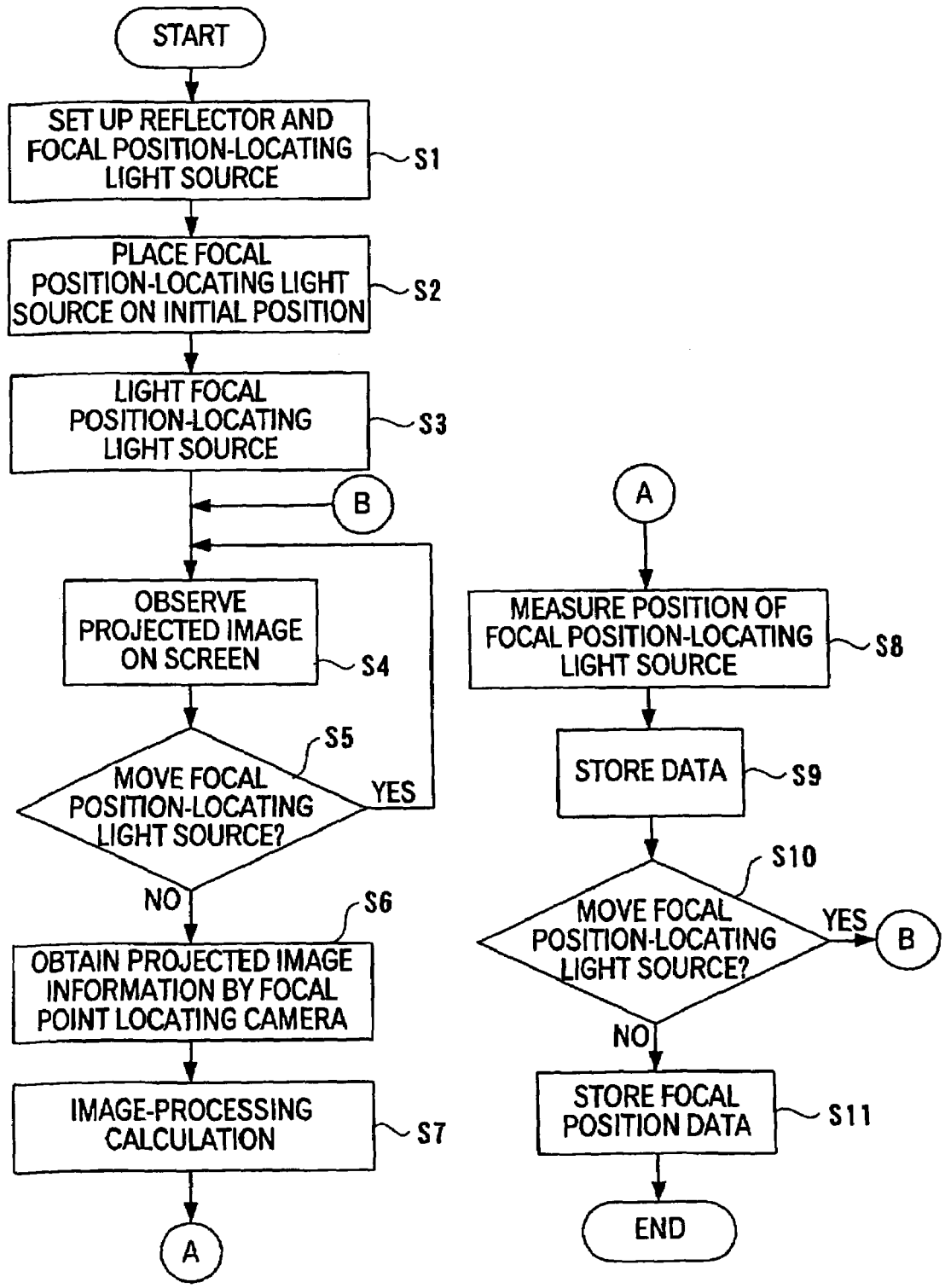
FIG. 14 is a flowchart explaining a procedure of the focal position-detecting of a reflector in the above first embodiment.

Next, a detecting work of the focal position F of the reflector 12 by using the focal position-detecting apparatus 3 according to the present embodiment will be described according to a flowchart of FIG. 14.

1) First, the reflector 12 is fixed to the reflector holding means 32, and at the same time the focal position-detecting light source 38 is fixed to the Y stage 372B of the position adjusting mechanism 37 through the discharge lamp holding means 39 (Process S1).

2) The X direction table 362 of the X direction moving mechanism 36 is moved to the left side in FIGS. 5, 6, so as to insert the focal position-detecting light source 38 into the reflector 12. After that, by the position adjusting mechanism 37, the position of the focal position-detecting light source 38 is adjusted to the XYZ directions respectively, and the apex 383A of the reflecting prism 383 is placed in the vicinity of the focal position F of the reflector 12 (Process S2).

3) A voltage is applied to the light emitting diode 382 of the focal position-detecting light source 38 so as to lighten the diode (Process S3). When, the light emitted from the focal position-detecting light source 38 is reflected from the reflector 12, and is projected onto the screen 341 through the condenser lens 331, thereby forming a projected image on the screen 341.

4) The projected image formed on the screen 341 is observed by visual observation (Process S4). If the projected image seems to be blurred, the focal position-detecting light source 38 is minutely moved so as to adjust its position (Process S5).

On the other hand, when it is verified that there is few blurring in the project image by visual observation, the focal position-detecting light source 38 is not moved (Process S5), but the zoom focusing of the focal position-detecting camera 35 is adjusted, and after that, the information on the projected image formed on the screen 341 is obtained by the focal position-detecting camera 35 (Process S6).

6) Based on the imaging information from the focal position-detecting camera 35, an image-processing calculation is performed by the computer 50 (Process S7). Specifically, for example, in the above-described first method, the comparison between the pattern shape stored in advance by a storage unit of the computer 50 and the projected image is performed. Or in the above-described second method, the counting of the number of pixels having the luminance value not more than a predetermined value inside the marking 343 of the screen 341 is performed 7) The coordinate value of the current position of the focal position-detecting light source 38 is detected (Process S8).

8) The calculation result data of the above-described image-processing calculation (data regarding the magnitude of the difference between the pattern shape and the projected image or data regarding the number of pixels having the luminance value not more than a predetermined value inside the marking 343 and the like) and the position data of the focal position-detecting light source 38 are corresponded with each other, and in that state, the information thereof is stored in the storage unit of the computer 50 (Process S9).

9) The current position of the focal position-detecting light source 38 is minutely moved to each direction respectively (Process S10), and the procedures from the Processes S4 to S10 are repeated plural times.

After the data is gathered plural times (Process S10), the position of the apex of the reflecting prism in the focal position-detecting light source 38 at the time when the blurring of the projected image on the screen 341 is the smallest is stored in the storage unit of the computer 50 as the focal position of the reflector (Process S11). Incidentally, the time when the blurring of the projected image is the smallest means the time when the difference between the pattern shape and the projected image is the smallest according to the first method. On the other hand, according to the second method, it means the time when the number of pixels having the luminance value inside the marking 343 not more than a predetermined value is the fewest.

(5. Advantages)

According to the present embodiment as described above, the following advantages are available.

(1) The light emitted from the focal position-detecting light source 38 and reflected from the reflector 12 is projected onto the screen 341, and the information on the reflected light projected onto the screen 341 is detected by the focal position-detecting camera 35. Subsequently, based on the reflected light information detected by the focal position-detecting camera 35, the focal position-detecting light source 38 is moved by the position adjusting mechanism 37 with respect to the reflector 12 so as to place the focal position-detecting light source 38 at the focal position F of the reflector 12, and the position of the apex 383A of the reflecting prism 383 of the focal position-detecting light source 38 at this time is detected as the focal position F of the reflector.

When the focal position F of the reflector 12 is detected, since the planer reflected light information on the screen 341 detected by the focal position-detecting camera 35 is used, the measurement by the three dimensional measuring instrument is made unnecessary, and unlike before it is possible to save the time and labor, thereby improving the working efficiency.

(2) Since the screen 341 is formed of ground-glass, the reflected light information transmitting the screen 341 can be obtained from the surface of the opposite side of the reflected light projection surface side of the screen 341. In this way, the focal position-detecting camera 35 can be placed on the opposite side of the reflected light projection surface side of the screen 341, and caring about an optical interference with the reflector 12 and the like placed at the reflected light projection surface side of the screen 341 is dispensed with, and the degree of freedom for designing can be improved.

(3) In the focal position-detecting light source 38, the light from the light emitting diode 382 is reflected on the conical surface 383B of the reflecting prism 383, and is emitted to the outside by passing through the hole portion 381A of the housing 381. Since the reflecting prism 383 reflects the light from the light emitting diode 382 in the vicinity portion of the apex 383A of the conical surface 383B and emits it to the outside of the housing 381, the apex 383A of the reflecting prism 383 can be regarded as the position of a so-called point light source. Accordingly, if such focal position-detecting light source 38 is used, the point light source can be easily and simply constituted.

(4) In the focal position-detecting light source 38, since the reflecting member which reflects the light emitted from the light emitting diode 382 is constituted by the reflecting prism 383, the conical surface 383D reflecting the light can be easily and smoothly formed, and the degree of accuracy of the reflecting surface can be improved.

(5) In the focal position-detecting light source 38, since the light emitted from the light emitting diode 382 is incident on the reflecting prism 383 through the optical fiber cable 384, a diffuse light emitted from the light emitting diode 382 can be prevented from leaking directly from the hole portion 381A of the housing 381 to the outside so that the reflected light only of the reflecting prism 383 can be allowed to emit from the hole portion 381A to the outside.

(6) In the focal position-detecting light source 38, since the light-emitting element is constituted by the light emitting diode 382, the time required from when the light-emitting element is lightened till when its luminance is stabilized can be shortened, and at the same time the heat generation by the lighting of the light-emitting element can be eliminated so that the cooling time after the light-out is made unnecessary.

SECOND EMBODIMENT

Figure 15:
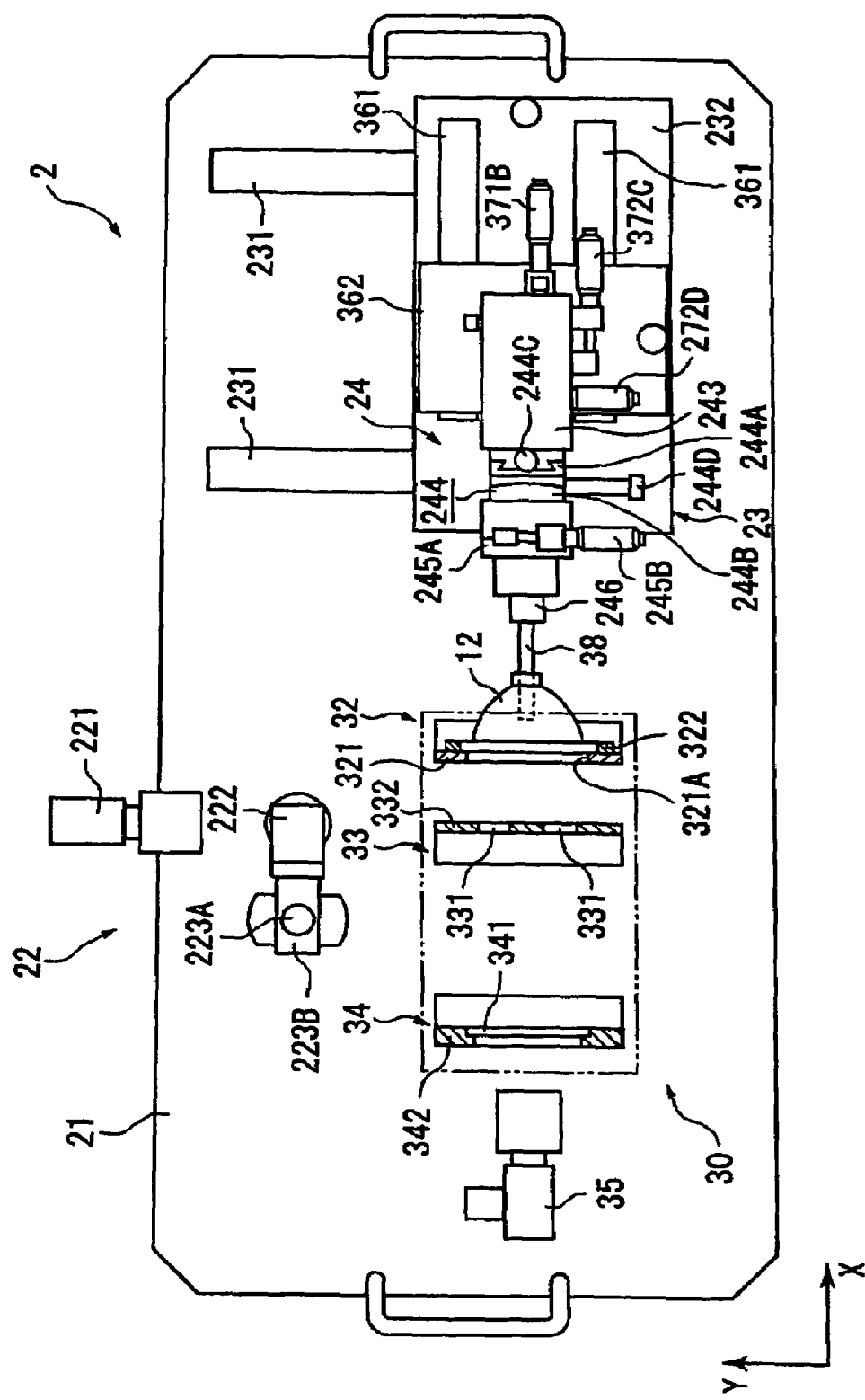
FIG. 15 is a top view showing a manufacturing apparatus of a light source apparatus according to a second embodiment of the present invention.
Figure 16:
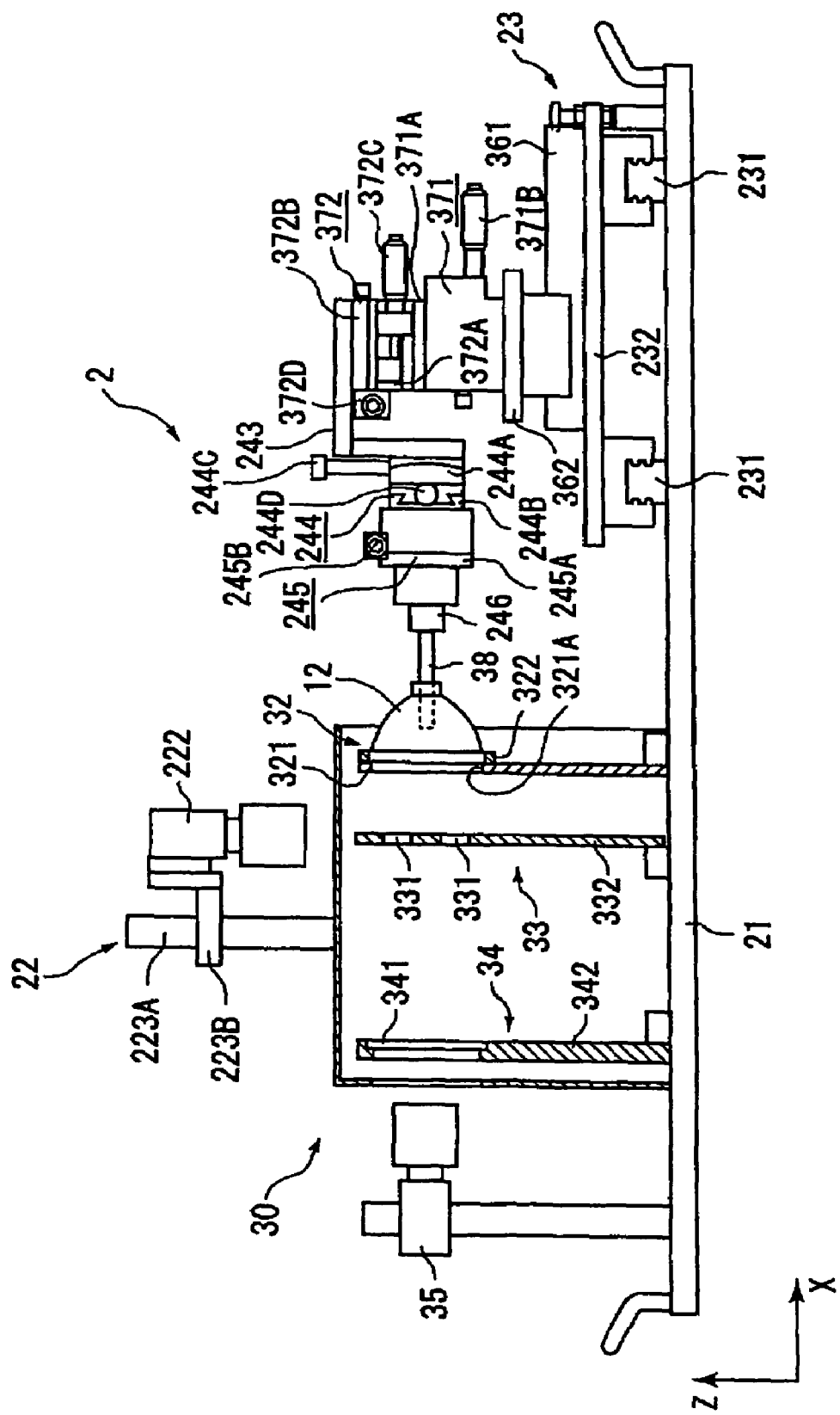
FIG. 16 is a side view showing the manufacturing apparatus in the above second embodiment.

In FIGS. 15 and 16, there are shown a top view and a side view respectively of a manufacturing apparatus 2 of the light source apparatus according to a second embodiment of the present invention.

The manufacturing apparatus 2 of the present embodiment is an apparatus constituted by including the focal position detecting apparatus of the reflector of the first embodiment, and, therefore, the same reference numerals will be applied to the parts having the same constitution as that of the first embodiment, and the description thereof will be omitted or simplified.

Incidentally, the manufacturing apparatus 2 of the present embodiment is also a positioning apparatus for performing the position alignment of a discharge lamp and a reflector based on the present invention.

The manufacturing apparatus 2 is constituted by including a base 21 and those systems placed on this base 21 respectively such as an emission position-detecting system 22 as an emission position location apparatus, an XY direction moving system 23, a position adjusting system 24 and a focal position-detecting system 30. Incidentally, a mechanism coupling the XY direction moving system 23 and the position adjusting system 24 is a first relative displacement means and a second relative displacement means according to the present invention.

The emission position-detecting system 22 comprises two sets of a first camera 221 and a second camera 222 as imaging means which are placed on the base 21 at an upper portion center in FIG. 15, and the imaging direction of the first camera 221 is meant to be horizontal, and the imaging direction of the second camera 222 is meant to be vertical. As the first and second cameras 221, 222, a so-called CCD (Charge Coupled Device) camera is used.

These first and second cameras 221, 222 are mounted to a support column 223A through a bracket 223B having an approximately L letter shape at the side.

Figure 17:
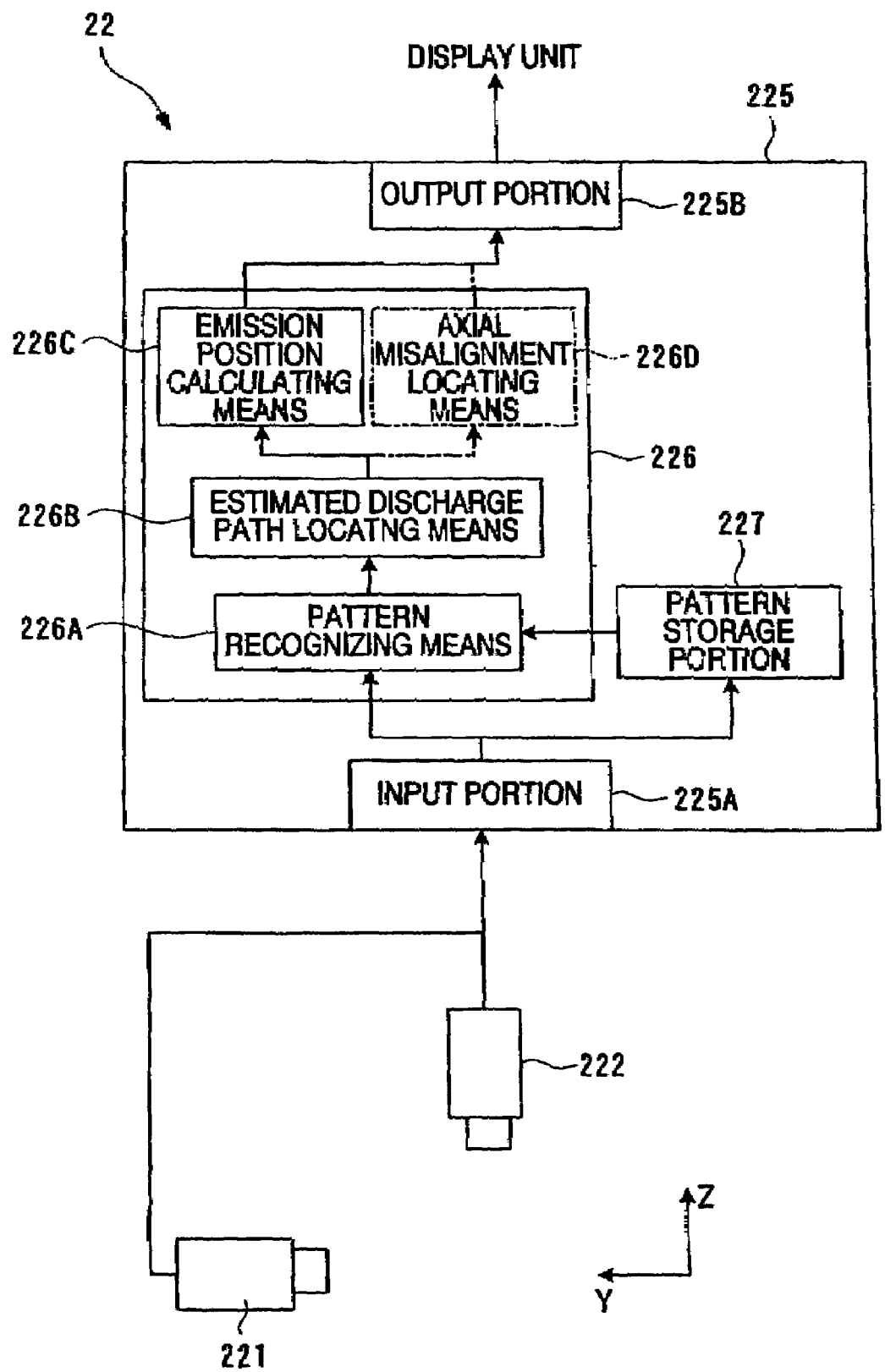
FIG. 17 is a schematic diagram showing an emission position-detecting system in the above second embodiment.

The imaging information obtained by the first and second cameras 221, 222 is downloaded into an image-processing unit 225 shown in FIG. 17.

The image-processing unit 225 comprises an input portion 225A to which signals from the first and second cameras 221, 222 are inputted; an image-processing portion 226 which image-processes the signals from this input portion 225A so as to convert them into an image information and at the same time performs various comparison works based on this image information; an output portion 225B for outputting the image information from the image-processing portion 226 to a display unit such as a display and the like; and a pattern storage portion 227. Incidentally, though an illustration is omitted, the image-processing unit 225 comprises the function of the computer 50 of the first embodiment in addition to the above described constitution, and is also electrically connected to a focal position-detecting camera 35.

The pattern storage portion 227 stores the pattern of the shape of electrodes 112 used for a discharge lamp 11, and such information is acquired from the standard imaging information obtained by the first and second cameras 221, 222. Here, the electrodes used for obtaining the standard imaging information are electrodes in a state of not being housed inside a main body 111, and are electrodes not adhered with mercury.

The image-processing portion 226 comprises pattern recognition means 226A; estimated discharge path detecting means 226B, and emission position calculating means 226C.

In the pattern recognition means 226A, when the imaging information obtained by the first and second cameras 221, 222 is fed, the shape of the electrodes 112 based on this imaging information and the pattern of the electrode shape based on the standard imaging information stored in the pattern storage portion 227 are compared, so that the shape of the electrodes 112 is recognized. That is, a so-called pattern matching is performed in the pattern recognition means 226A.

Since the electrodes 112 based on the imaging information are in a state of being housed inside the main body 111, there are often the cases where the profile line of the electrodes 112 is not clearly defined because mercury is adhered. For this reason, in the pattern recognition means 226A, the shape of the electrodes 112 based on the imaging information and the pattern based on the standard imaging information are compared to recognize the shape of the electrodes 112, so that the shape of the electrodes 112 can be accurately detected even when mercury is adhered on the electrodes 112.

The estimated discharge path detecting means 226B, based on the shape information on one pair of electrodes 112 detected by the pattern recognition means 226A, detects each position of the top ends most closely approached of the pair of electrodes 112, and detects the shortest path coupling the top ends. This shortest path approximately matches the discharge path 112A (FIG. 4) between the above-described pair of electrodes 112, and the shortest such path is estimated as the discharge path 12A.

The emission position calculating means 226C calculates a coordinate value of the center point of the shortest path (the estimated discharge path) detected by the estimated discharge path detecting means 226B, and such a center point is found as the coordinate value of the emission position (the center point of the emission) 112B (FIG. 4) of the discharge lamp 11.

The coordinate information on the emission position 112B of the discharge lamp 11 thus calculated is outputted to the display unit such as the display and the like together with the image information on the electrodes 112 by the output portion 225B. On the display unit, the image of the electrodes 112 based on the image information and XYZ coordinate values of the emission position 112B based on the coordinate information are displayed.

Figure 18:
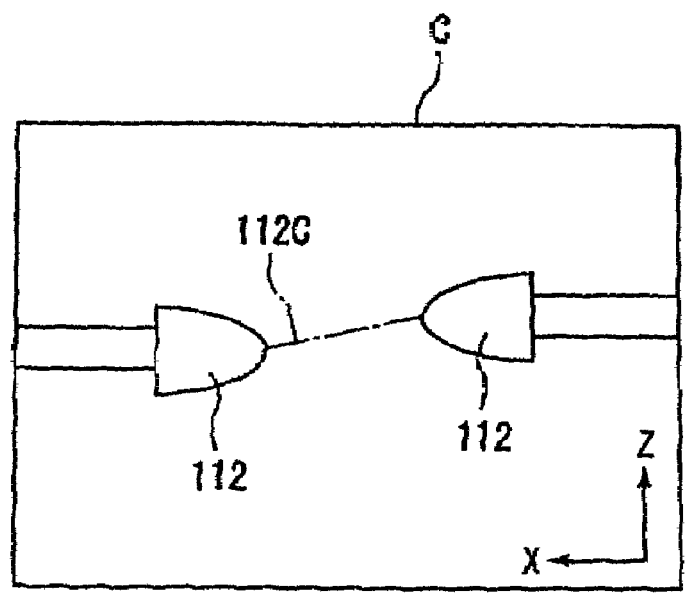
FIG. 18 is a schematic illustration showing an image by a first camera in the above second embodiment.
Figure 19:
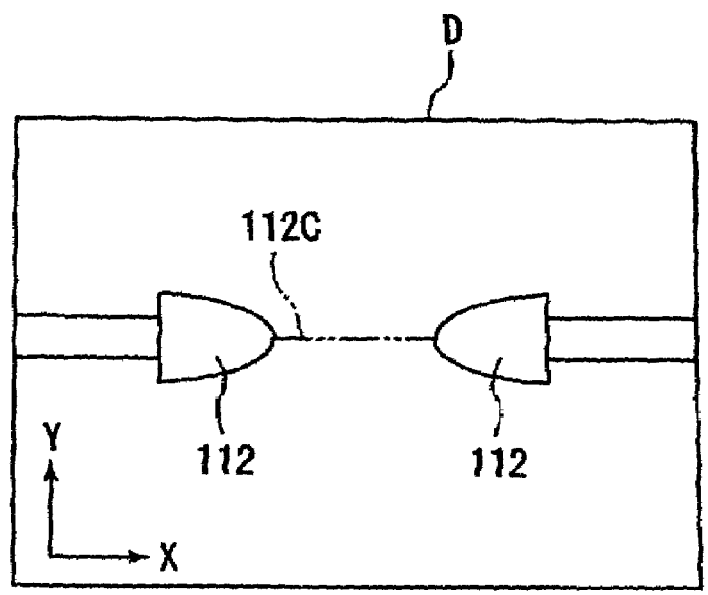
FIG. 19 is a schematic illustration showing the image by a second camera in the above second embodiment.

Here, in the case where the image outputted and displayed on the display unit from the image-processing portion 226 is an image C of FIG. 18 and an image D of FIG. 19, it is determined from these images C and D that an estimated discharge path (the shortest path) 112C between the pair of electrodes 112 is inclined. That is, it is determined that an axial misalignment is generated in the pair of opposing electrodes 112.

Such an axial misalignment of the pair of electrodes 112 sometimes occurs during the manufacturing process of the discharge lamp 11, and greatly affects the luminance condition of a projector 1.

For this reason, it is necessary to align the axial misalignment of the electrodes 112 to a certain direction so that the axial misalignment of the electrodes 112 does not affect the luminance of the projector 1.

To which direction the axial misalignment of the electrodes 112 should be aligned varies according to the constitution of the optical system of the projector. Therefore, the compensation of the axial misalignment of the electrodes 112 is performed by corresponding to the optical system.

In the optical system of the projector 1 of the present embodiment, for example, in the case where there is a high tolerance for the axial misalignment to the Z direction and a low tolerance for the misalignment to the Y direction, the electrode shifted to the direction shown in FIG. 18, FIG. 19 has by nature a large amount of the misalignment to the Z direction, and this misalignment is tolerated as it is. Therefore, no compensation of the axial misalignment is performed.

On the other hand, in the optical system of the other projector, for example, in the case where there is a low tolerance for the axial misalignment to the Z direction and a high tolerance for the axial misalignment to the Y direction, the discharge lamp 11 is rotated approximately at 90° with the longitudinal direction as an axis by a rotational adjusting system 245 to be described later, so that the axial misalignment of the pair of electrodes 112 can be compensated. That is, the axial misalignment to the Y direction can be made large and the axial misalignment to the Z direction can be made small.

Referring back to FIG. 15 and FIG. 16, the XY direction moving system 23 is constituted by including two pieces of Y direction rails 231 which are provided on a base 21 and extend in parallel to the Y direction, a Y direction table 232 slidably provided along the longitudinal direction (Y direction) of these Y direction rails 231, two pieces of X direction rails 361 which are placed on the Y direction table 232 and extend in parallel to the X direction, and a X direction table 362 slidably provided along the longitudinal direction (X direction) of these X direction rails 361.

The position adjusting system 24 is constituted by including a Z direction fine adjusting mechanism 371 placed on the X direction table 362, a XY direction fine adjusting mechanism 372 placed on this Z direction fine adjusting mechanism 371, a bracket 243 having approximately a L letter shape at its side, of which a horizontal portion is mounted on this XY direction fine adjusting mechanism 372, an inclination adjusting system 244 mounted on the left side in FIG. 16 of the vertical portion of this bracket, a rotational adjusting system 245 mounted at the left side in FIG. 16 of this inclination adjusting system 244, and light source holding means 246 which is mounted at the left side in FIG. 16 of this rotational adjusting system 245 and is capable of holding the end portion of the discharge lamp 11 and the end portion of the focal position-detecting light source 38.

Incidentally, the Z direction fine adjusting mechanism 371 and the XYZ fine adjusting mechanism 372 have the same constitution as that of the first embodiment and, therefore, the description thereof will be omitted.

The inclination adjustment system 244 and the rotational adjusting system 245 may use mechanisms using the conventional art, and specifically, in the present embodiment, the following mechanisms are used.

The inclination adjusting system 244 is constituted by including a first stage 244A and a second stage 244B, and a first handle 244C and a second handle 244D which slant these stages 244A, 244B respectively, and is constituted such that the first handle 244C is rotated so that the first stage 244A is inclined with an axis along the Y direction as a center, and the second handle 244D is rotated so that the second stage 244B is inclined with an axis along the D direction as a center.

The rotational adjusting system 245 is constituted by including a rotational table 245A with an axis along the X direction as a rotational axis and a micrometer head 245B, and is constituted such that an operator can directly make a coarse rotation of the rotational table 245A±180° by hand, and at the same time he can make a fine rotation of the rotational table 245A accompanied with the reciprocation of a spindle of the micrometer head 245B.

Incidentally, in the present embodiment, though a driving system is made into a manual system by using a micrometer head or a handle for the Z direction fine adjusting mechanism 371, the XY direction fine adjusting mechanism 372, the inclination adjusting system 244 and the rotational adjusting system 245, the driving system may be an automatic system by using a stepping motor and the like.

The focal position-detecting system 30 comprises reflector holding means 32; a condense lens portion 33; a screen portion 34; and a focal position-detecting came 35 as reflected light information detecting means. Incidentally, these reflector holding means 32, condenser lens portion 33, screen portion 34 and focal position-detecting camera 35 are constituted similarly as those of the first embodiment and, therefore, the description thereof will be omitted.

Figure 20:
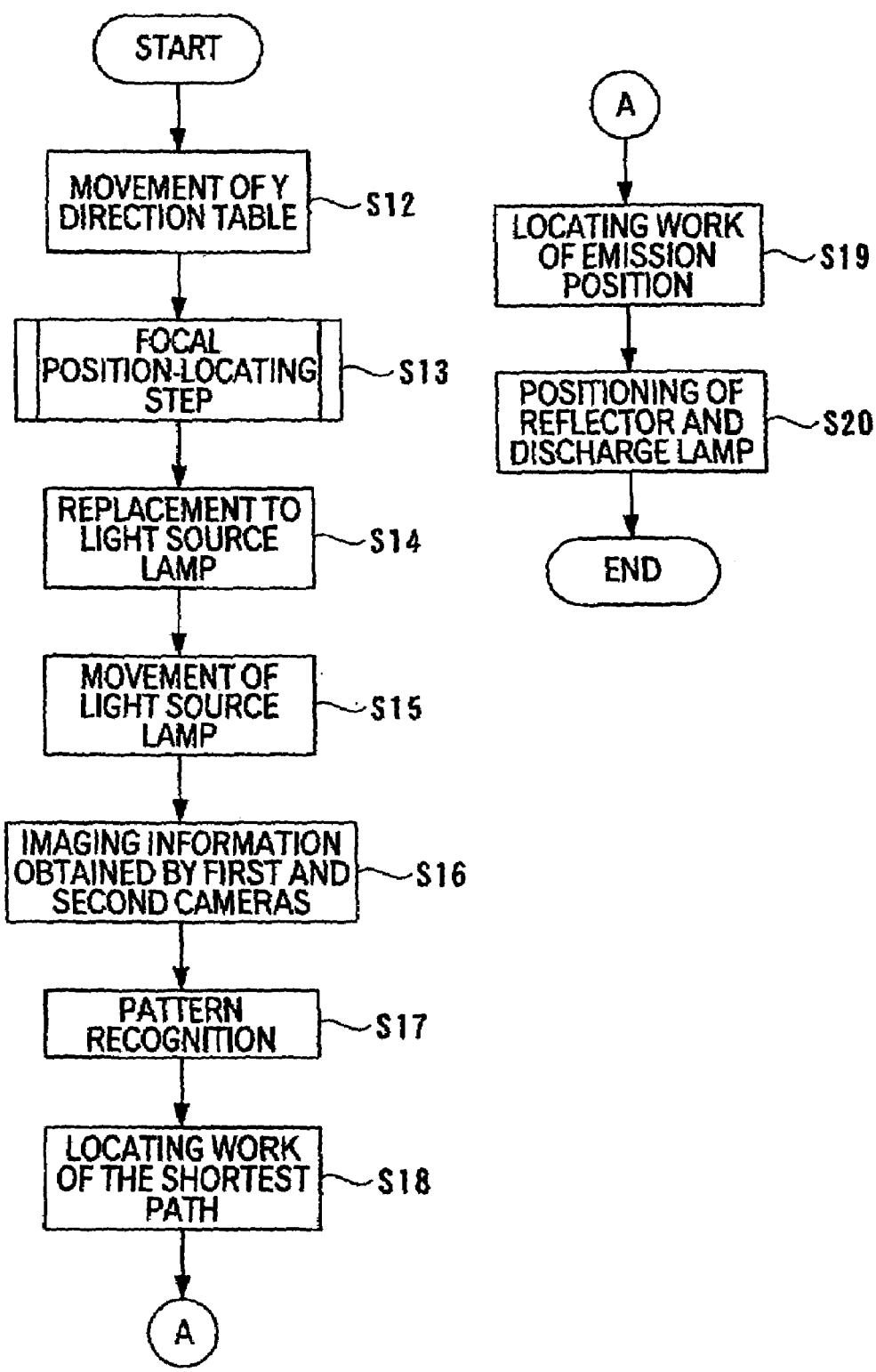
FIG. 20 is a flowchart explaining a manufacturing procedure of the light source apparatus in the above second embodiment.

Next, the manufacturing procedure of a lamp unit 10 by using the manufacturing apparatus 2 in the present embodiment will be described according to a flowchart shown in FIG. 20.

1) First, when the detecting work of the focal position F of the reflector 12 is performed, the Y direction table 232 of the XY direction moving system 23 is slid downward in FIG. 15 (Process S12). After that, as explained in FIG. 14 of the first embodiment, the focal position F of the reflector 12 is detected (Process S13).

2) After the focal position F of the reflector 12 is detected, the X direction table 362 of the XY direction moving system 23 is slid to the right direction in FIG. 15, and the focal position-detecting light source 38 is removed from the light source holding means 246, and the discharge lamp 11 is mounted (Process S14).

3) Subsequently, in order to detect the emission position 112B of the discharge lamp 11, the discharge lamp 11 is moved to the vicinity of the first and second cameras 221,222. That is, the Y direction table 232 of the XY direction moving system 23 is moved upward in FIG. 15 so as to move the X direction table 362 to the left direction in FIG. 15 (Process 15).

4) After that, the imaging information on the pair of electrodes 112 of the discharge lamp 11 is obtained by the first and second cameras 221, 222 (Process S16), and in the pattern recognition means 226A, the shape of the electrodes 112 based on the imaging information and the pattern based on the standard imaging information stored in the pattern storage portion 227 are compared so as to detect the shape of the electrodes 112 (Process S17).

5) Next, based on the shape information on the electro 112 of the imaging information, the shortest path (that is, the discharge path 112A) between the pair of electrodes 112 is detected by the estimated discharge path detecting means 226B, and the position of the center point (that is, the emission position 112A) of the shortest path is found by the emission position calculating means 226C, and the coordinate information on the emission position 112B together with the image of the electrodes 112 are outputted and displayed on the display and the like (Process S19). Incidentally, the operator performs the axial misalignment compensation of the discharge lamp 11 by the rotational adjusting system 245 based on the physical relationship of the electrodes 112 displayed on the display unit as occasion arises.

6) In this way as described above, the focal position F of the electrodes 112 and the emission position 112B of the discharge lamp 11 are found and, after that, based on these pieces of the coordinate value information, the positioning of the discharge lamp 11 is performed with respect to the reflector 12 so that the focal position F of the reflector 12 and the emission position 112B of the discharge lamp 11 are matched (Process S20).

Specifically, first, the X direction table 362 of the XY direction moving system 23 is moved to the right in FIG. 15, and the Y direction table 232 is moved downward in FIG. 15, and after that, the X direction table 362 is moved to the left in FIG. 15 so as to place the discharge lamp 11 in the vicinity of the reflector 12. The fine adjust of the position of the discharge lamp 11 is performed by each mechanism 371, 372 of the position adjusting system 24, thereby allowing the emission position 112B of the discharge lamp 11 and the focal position F of the reflector 12 to be approximately matched.

In this way, the positioning of the discharge lamp 11 and the reflector 12 is performed, and after that, a bonding agent 12C such as cement and the like is filled in an inserting hole 12B of the reflector 12 so as to fix the discharge lamp 11 to the reflector 12.

According to the present embodiment as described above, in addition to the above-described advantages (1) to (6) of the first embodiment, the following advantages are available.

(7) Since a separate focal position-detecting light source 38 other than the discharge lamp 11 is used for detecting the focal position F of the reflector 12, the lightening of the discharge lamp 11 is dispensed with, and the time required from when the light source lamp is lightened till when its luminance is stabilized is made unnecessary, and at the same time it is no longer necessary to wait until the source lamp cools down after the alignment adjustment is performed, thereby improving the manufacturing working efficiency of the lamp unit 10.

(8) In the emission position-detected system 22 of the manufacturing apparatus 2, first, the imaging information on the pair of electrodes 112 is obtained, and based on this imaging information, the shortest path coupling between the pair of electrodes 112 is found. Next the center point position of this shortest path is found as the emission position 112B of the discharge lamp 11. In this way, the shortest path coupling between the pair of electrodes 112 and the emission position 112B of the discharge lamp 11 are found and it is, therefore, not necessary to lighten the charge lamp 11.

Since the positioning of the discharge lamp 11 and the reflector 12 is performed so that the emission position 112B thus found comes to the focal position F of the reflector 12, that is, the luminance of the reflected light of the reflector 12 becomes approximately the maximum, the alignment adjustment of the lamp unit 10 can be performed without lightening the discharge lamp 11 and yet with a high degree of accuracy.

Accordingly, when the positioning work of the discharge lamp 11 and the reflector 12 is performed, the lightening of the discharge lamp 11 is made unnecessary, and, therefore, the time required from when the discharge lamp is lightened till when its luminance is stabilized is dispensed with, and at the same time it is no longer necessary to wail until the discharge lamp 11 cools down after the position adjustment is performed, thereby improving the working efficiency.

THIRD EMBODIMENT

Figure 21:
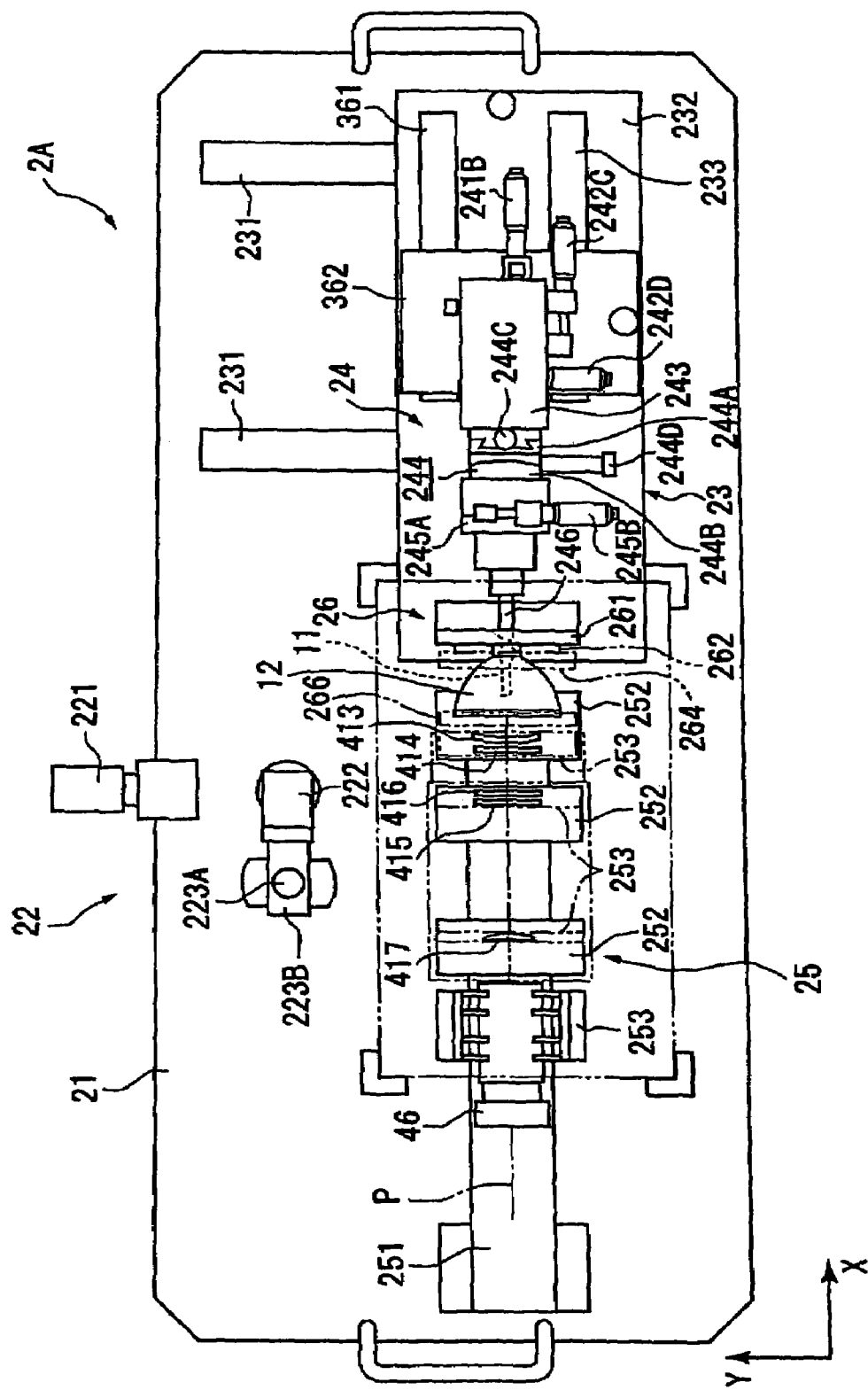
FIG. 21 is a top view showing a positioning apparatus according to a third embodiment of the present invention.
Figure 22:
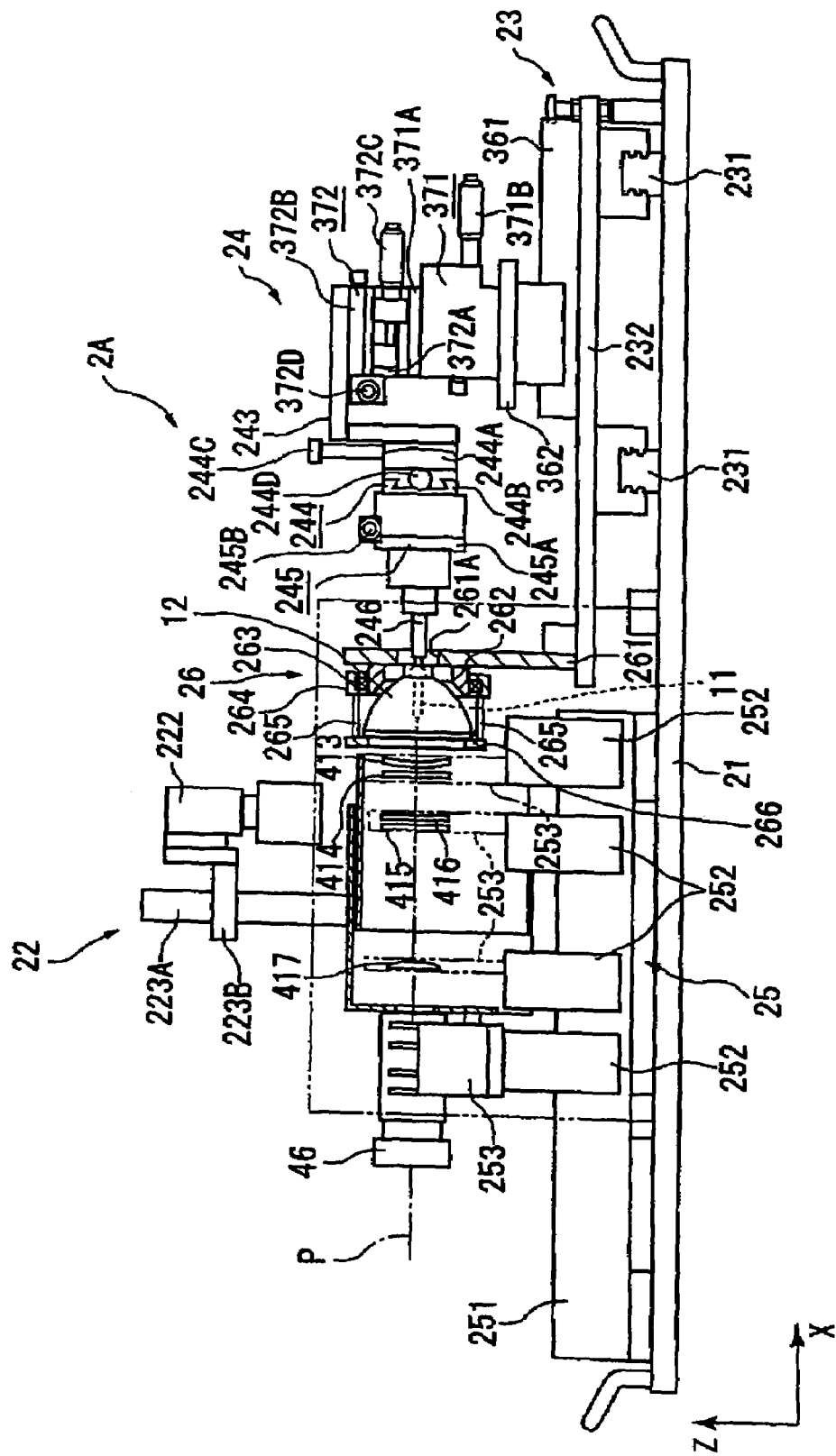
FIG. 22 is a side view showing the positioning apparatus in the above embodiment.
Figure 23:
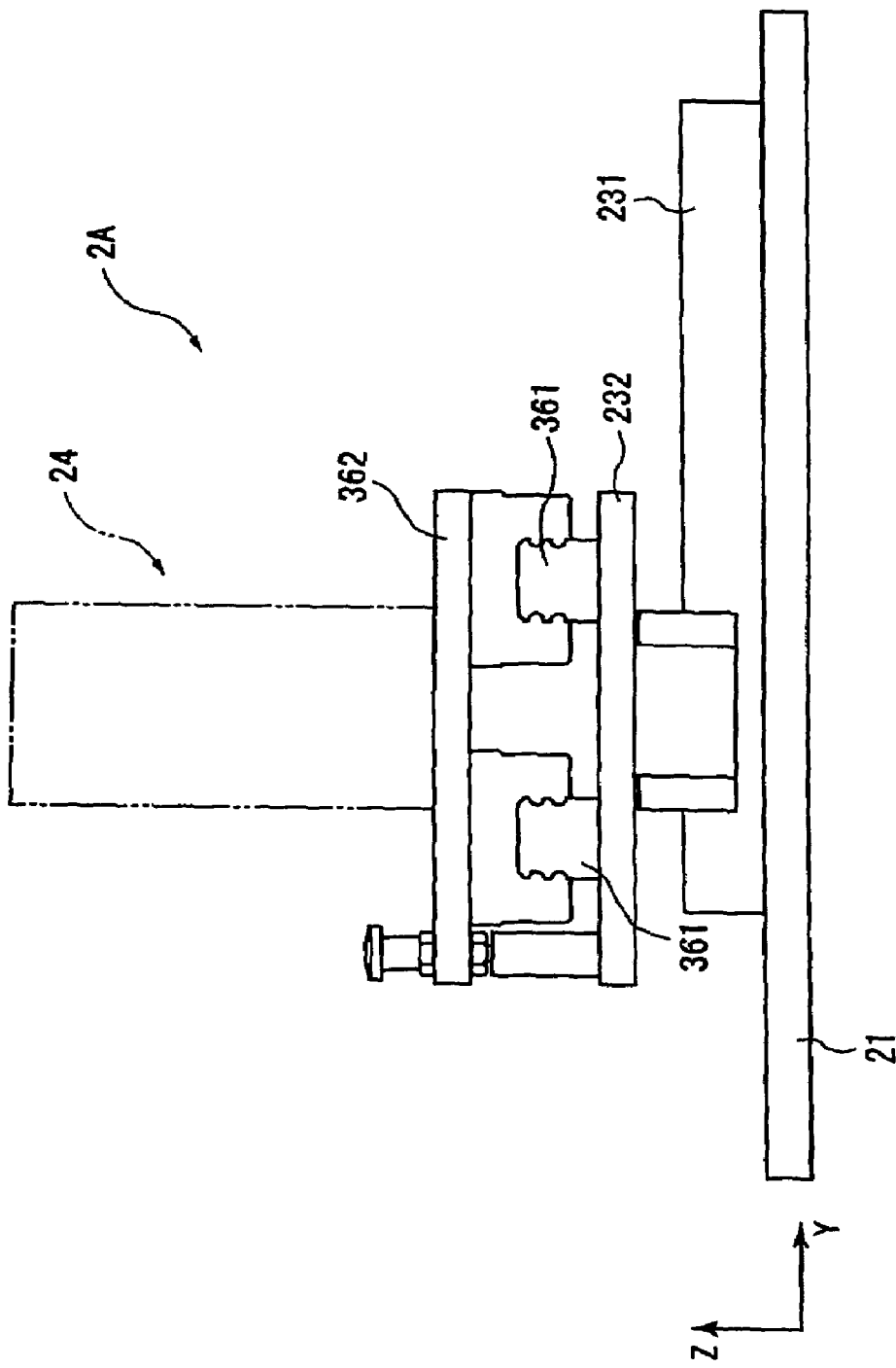
FIG. 23 is a rear view showing the positioning apparatus in the above embodiment.

In FIG. 21, there is shown a top view of a positioning apparatus 2A of the present embodiment, and in FIG. 22, there is shown a side view thereof, and in FIG. 23, a rear view thereof.

Although the positioning apparatus 2A of the present embodiment performs the positioning of a light source and a reflector based on the present invention, its basic constitution is the same as that of the above-described manufacturing apparatus 2 of the second embodiment, and the description thereof will be omitted by applying the same reference numerals to the same parts.

The positioning apparatus 2A is constituted by including a base 21 and those systems placed on this base 21 respectively such as an emission position-detecting system 22 as an emission position-detecting apparatus, a XY direction moving system 23 as relative displacement means, a position adjusting system 24 as relative displacement means and an luminance measuring system 25, and reflector holding means 26.

From among those systems, the emission position-detecting system 22, the XY direction moving system 23 and the position adjusting system 24 are as described previously in the second embodiment. On the other hand, the focal position-detecting system 30 available in the manufacturing apparatus 2 of the light source apparatus of the second embodiment is not available in the positioning apparatus 2A of the present embodiment, but the luminance measuring system 25 and the reflector holding means 26 which are newly provided instead of the system 30 are unique constituents for the positioning apparatus 2A. Hence, the luminance measuring system 25 and the reflector holding means 26 will be described below.

The luminance measuring system 25 is constituted by including a power supply unit not shown capable of lightening the discharge lamp 11, one piece of a support rail 251 (a so-called optical bench and the like) which is placed on the base 21 and extends to a X direction, and a plurality of sliders 252 (for example, four pieces in the present embodiment) which are slidably provided respectively along the longitudinal direction (the X direction) of this support rail 251.

A plurality of sliders 252 can be mounted with optical parts respectively through the holders 253 and, in order from the slider 252 of the left side in FIG. 21 and FIG. 22, are mounted with an unit comprising a projector lens 46, a field lens 417, a polarized light conversion element 415 and a second lens array 416, a first array lens 414, and parallelized lens 413, respectively. Each distance between these optical parts 46, 417, 415, 416, 414, 413 is set approximately the same as each distance set between the optical parts 46, 417, 415,416, 414, 413 of the projector 1 shown in the schematic illustration of FIG. 1.

However, the luminance measuring system 25 is not used for the positioning of the discharge lamp 1 and the reflector 12, but is provided for verifying the luminance condition of the reflected light from the reflector 12.

The reflector holding means 26 comprises a support plate 261 provided on a Y direction table 232 of the XY direction moving system 23, and on this support plate 261, an inserting hole 261A is formed, into which the discharge lamp 11 can be inserted. At the left side in FIG. 21 and FIG. 22 of the support plate 261 a cylindrical member 262 is mounted at a position corresponding to the insertion hole 261A. Here, the axial direction of the insertion hole 261A of the support plate 261 and the axial direction of the cylindrical member 262 are approximately matched.

The outer periphery of the cylindrical member 262 is provided with a ring member 264 through a bearing 263, and the axial directions with this ring member 264 and the cylindrical member 262 are matched, and with this axis as a center, the ring member 264 is rotatable with respect to the cylindrical member 262.

On the left side in the drawing of the ring member 264, a ring-shaped reflector holding member 266 is mounted through two pieces of a shaft 265. On the surface of the right side in the drawing of this reflector holding member 266, a shape is formed corresponding to the shape of the opening side of the reflector 12. The opening side of the reflector 12 is detachably mounted to the reflector holding member 266.

Next, the operation of the present embodiment will be described.

First, by the discharge lamp holding means 246 and the reflector holding means 26, the discharge lamp 11 and the reflector 12 are held, respectively. Here, the discharge lamp 11 is put into a state of being inserted into the reflector 12.

Next, in order to detect the emission position 112B of the discharge lamp 11, the discharge lamp 11 is moved to the vicinity of a first and a second cameras 221, 222. That is, the Y direction table 232 of the XY direction moving system 23 is moved upward in FIG. 21, and subsequently the X direction table 234 is moved to the left in FIG. 21.

After that, the imaging information on the pair of electrodes 112 of the discharge lamp 11 is obtained by a first and a second cameras 221, 222 and, in pattern recognition means 226A, the shape of the electrodes 112 based on the imaging information and a pattern based on the standard imaging information stored in a pattern storage portion 227 are compared so as to detect the shape of the electrodes 112.

Then, based on the shape information on the electrodes 112 of the imaging information, the shortest path (that is, a discharge path 112A) between the pair of electrodes 112 is detected by estimated discharge path detecting means 226B, and the position (that is, an emission position 112B) of the center point of the shortest path is found by emission position calculating means 226C, and the coordinate value of the emission position 112B together with the image of the electrodes 112 is outputted and displayed on the display unit such as the display and the like.

An operator performs an axial misalignment compensation of the discharge lamp 11 by a rotational adjusting system 245 based on the physical relationship of the electrodes 112 displayed on the display unit as occasion arises.

Further, the operator performs the positioning of the discharge lamp 11 with respect to the reflector 12 so that the focal position F of the reflector 12 and the emission position 112B of the discharge lamp 11 are matched based on the coordinate information on the emission position 112B.

Specifically, first, the X direction table 234 of the XY direction moving system 23 is moved to the right in FIG. 21, and the discharge lamp 11 is placed in the vicinity of the reflector 12. The flue adjustment of the position and the attitude of the discharge lamp 11 is performed by each mechanism 241, 242, 244 of the position adjusting system 24 so that the emission position 112B of the discharge lamp 11 and the focal position F of the reflector 12 are approximately matched.

Incidentally, XYZ coordinate positions of the focal position F of the reflector 12 are previously known and, for example, are positioned to original points (0, 0, 0).

In this way, the positioning of the discharge lamp 11 and the reflector 12 is performed. After that, a bonding agent 12C such as cement and the like is filled in the inserting hole 12B of the reflector 12 so as to fix the discharge lamp 11 to the reflector 12.

Here, before the discharge lamp 11 and the reflector 12 and fixed by the bonding agent 12C, the luminance condition of the reflected light of the reflector 12 may be verified in the luminance measuring system 25.

When the luminance condition is verified, in a state of the positioning of the discharge lamp 11 and the reflector 12 being performed, the Y direction table 232 of the XY direction moving system 23 is moved downward in FIG. 21, and the emission position 112B (the focal position F of the reflector 12) of the discharge lamp 11 is placed approximately on an optical axis P (an axis along the X direction) of the luminance measuring system 25. By lightening the discharge lamp 11, the luminance condition of the light passing through a parallelized lens 413, a first lens array 414, a second lens array 416, a polarized light conversion element 415, a field lens 417 and a projection lens 46 is allowed to be verified.

According to the present embodiment as described above, in addition to the above described advantages (8) of the second embodiment, the following advantages are available.

(9) In the emission position-detecting system 22, the standard imaging information on the standard electrodes used in the discharge lamp 11 is obtained in advance, and the imaging information obtained later is compared to the standard imaging information to determine the shape of a pair of electrodes 112, so that, even when mercury is adhered on the electrodes 112, the shape of the electrodes can be accurately determined and the shortest path (the estimated discharge path) between the par of electrodes and its center position (the emission position 112B) can be more accurately found.

(10) In the emission position-detecting system 22, the imaging information is obtained from two directions of the horizontal and vertical directions by the first and second cameras 221, 222, and based on these pieces of the imaging information, the axial misalignment of the pair of electrodes 112 is detected, and since this axial misalignment is aligned to a predetermined direction by corresponding to the optical system of a projector 1, it is possible to improve the luminance condition of a lamp unit 10, which is constituted by the discharge lamp 11 and the reflector 12.

[Fourth Embodiment]

Figure 24:
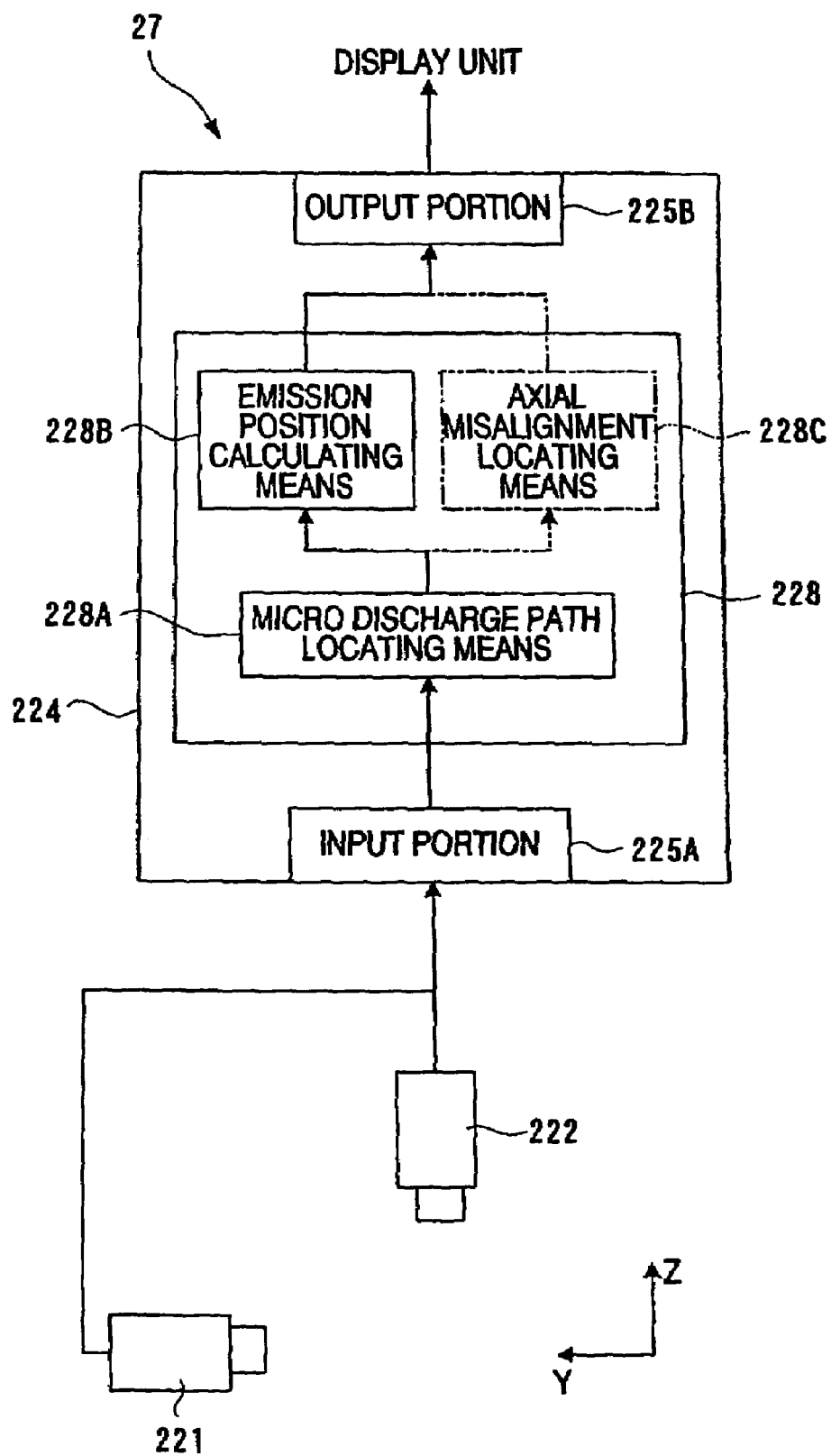
FIG. 24 is a schematic diagram showing an essential portion of a fourth embodiment of the present invention.

In FIG. 24, there is shown an emission position-detecting system 27 according to a fourth embodiment of the present invention. The present embodiment uses the emission position-detecting system 27 instead of the above-described emission position-detecting system 22 in the third embodiment, and other constitutions (for example, the constitutions of a XY direction moving system, a position adjusting system, a projector and the like) are approximately the same as those of the third embodiment. Therefore, the description thereof will be omitted or simplified by using the same reference numerals.

The emission position system 27 comprises a first camera 221 and a second camera 222, and an image-process unit 324 into which the imaging information obtained by these first and second cameras 221, 222 is downloaded. Incidentally, the first and second cameras 221, 222 are approximately the same as those of the third embodiment and, therefore, the description thereof will be omitted.

These first and second cameras 221, 222 obtain the imaging information on a micro discharge path at the time when a micro discharge is generated between a pair of electrodes 112 of a discharge lamp 11. Here, the micro discharge is generated plural times, and the imaging information on a plurality of micro discharge paths is obtained The imaging information obtained in this way by the first and second cameras 221,222 is downloaded into the image-processing unit 324.

The image-processing unit 324 comprises an input portion 225A to which signals from the first and second cameras 221, 222 are inputted; an image-processing portion 228 for processing the signals from this input portion 225A; and an output portion 225B for outputting the output signals from this image-processing portion 228 to a display unit such as a display and the like.

The image-processing portion 228 comprises micro discharge path detecting means 228A and emission position calculating means 228B.

The micro discharge path detecting means 228A finds the coordinate values of a plurality of micro discharge paths from imaging information inputted from the input portion 225A.

The emission position calculating means 228A calculates the coordinate value of each center point of a plurality of micro discharge paths detected by the micro discharge path detecting means 228A, and after that, a mean place of a plurality of these center points is found as an emission position 112B of the discharge lamp 11.

The coordinate information on the emission position 112B of the discharge lamp 11 calculated in this way and the image of the electrodes 112 based on the imaging information are outputted and displayed on a display unit such as a display and the like by the output portion 225B.

Incidentally, in the present embodiment, an operator detects an axial misalignment of a pair of electrodes 112 from the micro discharge path displayed on the display unit, and aligns the axial misalignment to a predetermined direction similarly as the third embodiment, so that the luminance condition of a lamp unit 10 can be improved.

According to the present embodiment as described above, in addition to the above described advantages (8) to (10) of the third embodiment, the following advantages are available.

(11) In the emission position-detecting system 27, the images of the micro discharge path generated between the pair of electrodes 112 are obtained by the first and second cameras 221, 222, and a center point of the micro discharge path is found from these images, and this center point is found as the emission position 112B of the discharge lamp 11.

In this way, the emission position 112B of the discharge lamp 11 is found by using the micro discharge and it is, therefore, possible to find the emission position of the discharge lamp 11 in a state of the temperatures of the discharge lamp 11 being hardly raised.

Since the positioning of the discharge lamp 11 and the reflector 12 is performed so that the emission position 112B thus found comes to the focal position F of the reflector 12, that is, the luminance of the reflected light of the reflector 12 becomes approximately the maximum, the alignment adjustment of a lamp unit 10 can be performed with the temperatures of the discharge lamp 11 being hardly raised. Accordingly, when the positioning work of the discharge lamp 11 and the reflector 12 is performed, since the temperatures of the discharge lamp are hardly raised, the time required from when the discharge lamp 11 is lightened till when its luminance is stabilized and the time from when the discharge lamp is turned off till when the lamp cools down after the positioning work is performed are dispensed with, so that the time required for the positioning work can be shortened.

(12) The micro discharge is generated plural times, and in the emission position calculating means 228B, each center point is detected from a plurality of micro discharge paths and the mean place of a plurality of these center points is found as the emission position 112B of the discharge lamp 11 and it is, therefore, possible to find the emission position 112B of the discharge lamp 11 more accurately.

[Other Embodiments]

It should be understood that the present invention is not limited to each of the above-described embodiments, but that modifications and improvements within the range of achieving the object of the present invention are included in the present invention.

For example, in each of the above-described embodiments, though two sets of the first and the second cameras 221, 222 of which the imaging directions are horizontal and vertical directions are used, more than three sets of the cameras having different imaging directions may be used. Further, the imaging directions thereof are not limited to the horizontal and vertical directions.

Further, one set of the camera may be used to obtain a plural of imaging information imaging a pair of electrodes 112 from different directions by rotating a discharge lamp 11 by a rotational adjusting mechanism 245. Even in such a case, not only an emission position 1122B of the discharge lamp 11, but also the axial misalignment of a pair of opposing electrodes 112 can be detected. In addition, since the camera used is only one set, it is possible to reduce the cost.

In each of the above described embodiments, though the positioning apparatus 2A is used for the lamp unit of the type 10 which fixes the discharge lamp 11 to the reflector 12, the positioning apparatus 2A may be used for a lamp unit 10A, for example, as shown in FIG. 25.

In FIG. 25, the lamp unit 10A is constituted by including the discharge lamp 11, the reflector 12, and a lamp housing 13 as a fixing member to which these discharge lamp 11 and the reflector 12 are fixed in a mutually independent state. Incidentally, since the discharge lamp 11 and the reflector 12 are approximately the same as those of respective embodiments as described above, the description thereof will be omitted.

The lamp housing 13 has a base portion 131 mounted on the frame body not shown of a projector 1, and a reflector holding portion 132 and a discharge lamp holding portion 133 placed on this base portion 131 respectively by opposing to each other.

From among those portions, the reflector holding portion 132 is mounted with an opening side formed in a frame shape of the reflector 12.

On the other hand, an inserting hole 133A is formed in a discharge lamp holding portion 133, and in a state of the discharge lamp 11 being inserted into this inserting hole 133A, a bonding agent 133B such as cement and the like is filled so that the discharge lamp 11 is mounted on the discharge lamp holding portion 133.

The discharge lamp 11, in a state of piercing through the reflector 12, is positioned and fixed to the lamp housing 13.

In the lamp unit 10A having such a constitution, first, for example, the reflector 12 is fixed in advance to a reflector holding portion 132 of the lamp housing 13 in a state of a protection glass plate 14 being held tightly, and the lamp housing 13 is set on a Y direction table 232 through adequate lamp housing holding means.

Next, an emission position 112B of the discharge lamp 11 of emission position-detecting systems 22, 27 is detected. Based on the emission position 112B thus found of the discharge lamp 11, a mounting position with respect to the lamp housing 13 of the discharge lamp 11 is adjusted by a position adjusting system 24 so that the positioning of the discharge lamp 11 and the reflector 12 is performed.

By so doing, when the positioning work of the discharge lamp 11 and the reflector 12 is performed, since the time required from when the discharge lamp 11 is lightened till when its luminance is stabilized and the time required from when the discharge lamp 11 is turned off and till when it cools down is dispensed with, the time required for the positioning work can be shortened.

In the above-described third embodiment, the pattern recognition means 226A and the pattern storage portion 227 are provided in the emission position-detecting system 22, and the shape of the electrodes 112 is determined by the pattern matching. However, the shape of the electrodes 112 based on the imaging information may be recognized as it is so that the shape of the electrodes 112 is detected without performing the pattern matching, and such a case is included in the present invention.

Further, in each of the above-described embodiments, though the angle to the direction of the light emitted from the light emitting diode 382 of the conical surface 383B of the reflecting prism 383 is set constant (approximately 45°), for example, a plurality of reflecting prisms, which are different in the angle of the conical surface, are prepared in advance, and the angle of the conical surface of the reflecting prism may be adjusted by replacing the reflecting prism.

By so doing, since the conical surface of the reflecting prism is provided so as to be able to adjust its angle to the direction of the light emitted from the light emitting diode 382, the emitting direction of the light reflected by the reflecting prism can be randomly adjusted and, for example, the light can be reflected on a random portion of the reflecting surface 12A of the reflector 12. In the case where this is used for detecting the focal position F of the reflector 12, the reflecting prism is replaced plural times, and the reflected light information projected onto the screen every time the prism is replaced is detected, so that the information on the reflecting surface 12A of the reflector 12 can be obtained in a wide range. If the focal position F of the reflector 12 is detected based on such a wide range of information, a detecting accuracy of the focal position F can be improved.

In each of the above-described embodiments, though the shape of the top end of the reflecting prism 383 is conical, the shape may be pyramidal. In brief, it may be formed in a pyramidal shape.

In each of the above-described embodiments, though the light-emitting element of the focal position detecting light source 38 is constituted by the light emitting diode 382, the light-emitting element according to the present invention should not be limited to this, but various light-emitting elements such as a silicon light-emitting element and the like may be used.

In each of the above-described embodiments, though the optical fiber cable 384 is placed between the light emitting diode 382 and the reflecting prism 383, it is not always necessary to provide this optical fiber cable 384, and the case where the optical fiber cable is not provided is also included in the present invention.

In each of the above-described embodiments, though the reflecting prism 383 is used as the reflecting member in the focal position-detecting light source 38, the reflecting member according to the present invention should not be limited to this, but an adequate mirror which can reflect the light emitted from the light-emitting element may be applied.

In the above-described second embodiment, though the axial misalignment of the pair of electrodes 112 of the discharge lamp 11 is aligned to a predetermined direction based on the image outputted and displayed in the display unit, for example, the axial misalignment detecting means may be provided such that the information on a rotational angle of the discharge lamp 11 necessary to align the axial misalignment to a predetermined direction is outputted on the display unit. In such a case, axial misalignment detecting means 226D (see FIG. 17) shown by a tow-dot chain line may be provided in the image-processing portion 226.

In each of the above-described embodiments, though the reflector 12 is used in which the reflecting surface 12A is formed in a radial source shape, the reflector according to the present invention should not be limited to this, but a reflector may be used in which the reflecting surface is formed in an ellipsoidal surface shape. In such a case, it is necessary to place the parallelized lens between the reflector and the first lens array 414. Further, in the focal position-detecting apparatus 3 of the first embodiment and the manufacturing, apparatus 2 of the second embodiment, it is also necessary to place the parallelized lens between the reflector and the condenser lens 331.

Incidentally, even when the reflector having the ellipsoidal surface is used, the positioning of the reflector and the discharge lamp 11 is performed in a state of the focal position of the reflector and emission position of the discharge lamp 11 being approximately matched.

In each of the above-described embodiments, though the screen 341 of the screen portion 34 is constituted by groundglass, the screen 341 may be constituted by other transmissive member or non-transmissive member. However, if the screen is constituted by the transmissive member, the focal position-detecting camera 35 can be placed at the opposite side of the reflecting light projection surface side of the screen 341, and the focal position-detecting camera 35 can be thus placed without caring about the physical relationship with the reflector 12 and the like placed at the reflection light projection surface side of the screen 341, so that the degree of designing can be improved.

In the above-described second embodiment, though, in the emission position-detecting system 22, the shortest path between the pair of electrodes 112 of the discharge lamp 11 is estimated as the discharge path 112A so as to detect the emission position 112B, the emission position-detecting system 22 may be constituted such that a micro discharge is generated between the pair of electrodes 112 and the center point of this micro discharge path is detected as the emission position 112B. In such a case, when the emission position 112B of the discharge lamp 11 is detected, since the micro discharge is used, the time required from when the discharge lamp is lightened till when its luminance is stabilized is dispensed with, and also since the temperatures of the discharge lamp 11 are hardly raised, it is no longer necessary to wail until the discharge lamp 11 cools down after the position adjustment is performed, thereby improving the working efficiency.

In each of the above described embodiments, though the manufacturing apparatus 2 and the focal position-detecting apparatus 3 are used for the lamp unit 10 of the type which adheres and fixes the discharge lamp 11 to the reflector 12, the light source apparatus of the type which is constituted by including, for example, a light source lamp, a reflector, and a fixing member to which these light source lamp and reflector are fixed respectively in a mutually independent state may be used.

As the projector of the present invention, not only a projector which uses the liquid crystal panel as a light modulator, but also, for example, a projector comprising the light modulator which uses a plasma element or a micro-mirror, or a projector comprising a reflector type light modulator which emits the light by reflecting and modulating or a projector of a single-panel type, a two-panel type, or a rear type can be adopted. In brief, if it is a projector in which the light flux emitted from the light source lamp is modulated according to the image information so as to form an optical image and this image is magnified and projected, its constitution and the like may be adequately decided upon implementation of the embodiments.

INDUSTRIAL AVAILABILITY

The present invention can be used as a light source apparatus, its manufacturing method and apparatus, a reflector focal position-detecting method and apparatus, a focal position-detecting light source, a discharge lamp emission-position-detecting method and apparatus and a discharge lamp-reflector positioning method and apparatus, and more in particular, can be used for the light source of a projector which magnifies and projects an image.

The invention claimed is:

1. An emission position-detecting method of a discharge lamp lightened by a discharge generated between a pair of opposing electrodes, comprising:
   obtaining the imaging information on said pair of electrodes;
   detecting the shortest path coupling between said pair of electrodes based on this imaging information; and
   detecting a center point of this shortest path as an emission position of said discharge lamp.

2. The emission position-detecting method of the discharge lamp according to claim 1,
   wherein the standard imaging information on the standard electrodes used in said discharge lamp is obtained in advance, and
   wherein said imaging information is compared to said standard imaging information so as to determine the shape of said pair of electrodes.

3. A positioning method of a discharge lamp and a reflector for performing a positioning of the discharge lamp and the reflector which has a focal position and reflects the light ray reflected from said discharge lamp,
   wherein the emission position of said discharge lamp is detected by using the emission position-detecting method of the discharge lamp according to claim 1, and
   wherein the emission position of said discharge lamp is placed at said focal position of said reflector.

4. The positioning method of the discharge lamp and the reflector according to claim 3,
   wherein the imaging information on said pair of electrodes is plurally obtained from different imaging directions, and
   wherein, from among said pair of electrodes, a misalignment of the other electrode with respect to either one of the electrodes is detected.

5. A positioning method of a discharge lamp and a reflector for performing a positioning of the discharge lamp and the reflector which reflects the light ray reflected from this discharge lamp, comprising:
   a detecting work step of detecting the emission position of said discharge lamp by using the emission position-detecting method of the discharge lamp according to claim 1;
   a fixing work step of fixing said discharge lamp and said reflector to a fixing member respectively in a state of being mutually independent; and
   an adjusting work step of adjusting a mounting position with respect to said fixing member of said discharge lamp and/or said reflector based on said emission position.

6. An emission position-detecting method of a discharge lamp lightened by a discharge generated between a pair of opposing electrodes,
   wherein a micro discharge is generated between said pair of electrodes of said discharge lamp;
   wherein the imaging information on this micro discharge is obtained; and
   wherein, based on this imaging information, a center point of said micro discharge path is detected as an emission position of said discharge lamp.

7. The emission position-detecting method of the discharge lamp according to claim 6,
   wherein a plurality of said micro discharge paths are found by generating said micro discharge plural times,
   wherein each center point of said plurality of micro discharge paths is detected, and
   wherein a mean place of a plurality of these center points is found as the emission position of said discharge lamp.

8. An emission position-detecting apparatus of a discharge lamp lightened by a discharge generated between a pair of opposing electrodes, comprising:
   discharge lamp holding means for holding said discharge lamp;
   imaging means for obtaining imaging information on said pair of electrodes of said discharge lamp held by this discharge holding means;
   estimated discharge path detecting means for detecting the shortest path coupling between said pair of electrodes based on said imaging information; and
   emission position calculating means for finding a coordinate value of the center point of said shortest path detected by this estimated discharge path detecting means as the coordinate value of the emission position of said discharge lamp.

9. A positioning apparatus for performing a positioning of a discharge lamp lightened by a discharge generated between a pair of opposing electrodes and a reflector reflecting the light ray emitted from this discharge lamp, comprising;
   an emission position-detecting apparatus according to claim 8,
   reflector holding means for holding said reflector, and
   relative displacement means for relatively displacing said discharge lamp with respect to the reflector held by this reflector holding means.

* * * * *